US008535632B2

(12) United States Patent
Chase et al.

(10) Patent No.: US 8,535,632 B2
(45) Date of Patent: Sep. 17, 2013

(54) CERAMIC NANOFIBERS CONTAINING NANOSIZE METAL CATALYST PARTICLES AND MEDIUM THEREOF

(75) Inventors: George G. Chase, Wadsworth, OH (US); George R Newkome, Medina, OH (US); Sphurti Bhargava, Copley, OH (US); Soo-Jin Park, Jeonju (KR); Sneha Swaminathan, Akron, OH (US)

(73) Assignee: The University of Akron, Akron, OH (US)

( * ) Notice: Subject to any disclaimer, the term of this patent is extended or adjusted under 35 U.S.C. 154(b) by 96 days.

(21) Appl. No.: 12/736,165

(22) PCT Filed: Mar. 19, 2009

(86) PCT No.: PCT/US2009/000173
§ 371 (c)(1),
(2), (4) Date: Sep. 16, 2010

(87) PCT Pub. No.: WO2009/117114
PCT Pub. Date: Sep. 24, 2009

(65) Prior Publication Data
US 2011/0052467 A1 Mar. 3, 2011

Related U.S. Application Data

(60) Provisional application No. 61/070,210, filed on Mar. 20, 2008.

(51) Int. Cl.
*B01D 53/56* (2006.01)
*B01D 53/86* (2006.01)
*B01J 8/00* (2006.01)
*B01J 8/02* (2006.01)
*B01J 35/02* (2006.01)
*B01J 8/18* (2006.01)
*B01J 29/00* (2006.01)
*B01J 23/00* (2006.01)
*B01J 21/00* (2006.01)
*C01B 21/00* (2006.01)
*F27B 15/00* (2006.01)

(52) U.S. Cl.
USPC ............ 423/239.1; 502/60; 502/74; 502/87; 502/240; 502/300; 502/326; 502/327; 502/328; 502/329; 502/330; 502/331; 502/332; 502/333; 502/334; 502/335; 502/336; 502/337; 502/338; 502/339; 502/344; 502/351; 502/355; 502/415; 502/439; 977/762; 977/775; 422/139; 422/211

(58) Field of Classification Search
USPC ............ 502/60, 74, 87, 240, 300, 326–339, 502/344–351, 355, 415, 439; 977/762, 775; 423/239.1; 422/139, 211
See application file for complete search history.

(56) References Cited

U.S. PATENT DOCUMENTS 3,846,527 A * 11/1974 Winter et al. ................. 264/623
3,881,962 A * 5/1975 Rubinstein ................... 136/209

(Continued)

FOREIGN PATENT DOCUMENTS

EP     1 652 573 A1   5/2006
JP     2004-074061    11/2004

(Continued)

OTHER PUBLICATIONS

Mustafa M. Demir et al., Palladium Nanoparticles by Electrospinning From Poly(Acrylonitrile-Co-Acrylic Acid)-PdCl$_2$ Solutions. Relations Between Preparation Conditions, Particle Size, and Catalytic Activity, Macromolecules 2004, 37, 1787-1792; 2004 American Chemical Society, Published on Web Feb. 13, 2004.

(Continued)

*Primary Examiner* — Cam N. Nguyen
(74) *Attorney, Agent, or Firm* — Renner Kenner Greive Bobak Taylor & Weber

(57) ABSTRACT

The present invention relates to a catalyst-containing nanofiber composition, comprising a ceramic nanofiber having a plurality of metal catalysts wherein the metal catalysts exist as dispersed particles partially embedded in the nanofiber and cover from about 1% to about 90% of the surface area of the ceramic nanofiber.

18 Claims, 16 Drawing Sheets

(56) References Cited

U.S. PATENT DOCUMENTS

| | | | |
|---|---|---|---|
| 5,856,263 A | 1/1999 | Bhasin et al. | |
| 6,916,758 B2 * | 7/2005 | Reneker et al. | 502/87 |
| 7,179,561 B2 * | 2/2007 | Niu et al. | 429/409 |
| 7,390,760 B1 * | 6/2008 | Chen et al. | 442/341 |
| 7,482,297 B2 * | 1/2009 | Khatri et al. | 501/95.1 |
| 7,611,878 B2 * | 11/2009 | Kim et al. | 435/174 |
| 7,722,796 B1 * | 5/2010 | Young | 264/562 |
| 7,985,475 B2 * | 7/2011 | Dubrow | 428/359 |
| 2001/0045547 A1 * | 11/2001 | Senecal et al. | 252/501.1 |
| 2005/0042151 A1 | 2/2005 | Alward et al. | |
| 2005/0287042 A1 * | 12/2005 | Chase et al. | 422/88 |
| 2006/0065021 A1 | 3/2006 | Khatri et al. | |
| 2006/0159916 A1 * | 7/2006 | Dubrow et al. | 428/357 |
| 2006/0226580 A1 | 10/2006 | Xia et al. | |
| 2007/0018361 A1 | 1/2007 | Xu | |
| 2008/0264259 A1 * | 10/2008 | Leung | 96/143 |
| 2009/0068461 A1 * | 3/2009 | Reneker et al. | 428/366 |
| 2012/0077280 A1 * | 3/2012 | Chase et al. | 436/164 |

FOREIGN PATENT DOCUMENTS

| | | |
|---|---|---|
| WO | WO 2005/024101 A1 | 3/2005 |
| WO | 2007/030669 A2 | 3/2007 |

OTHER PUBLICATIONS

Extended European Search Report dated Mar. 12, 2012 related to counterpart Application No. EP09722721.9 based on International Appl. No. PCT/US2009/001723; 7 pages.

* cited by examiner

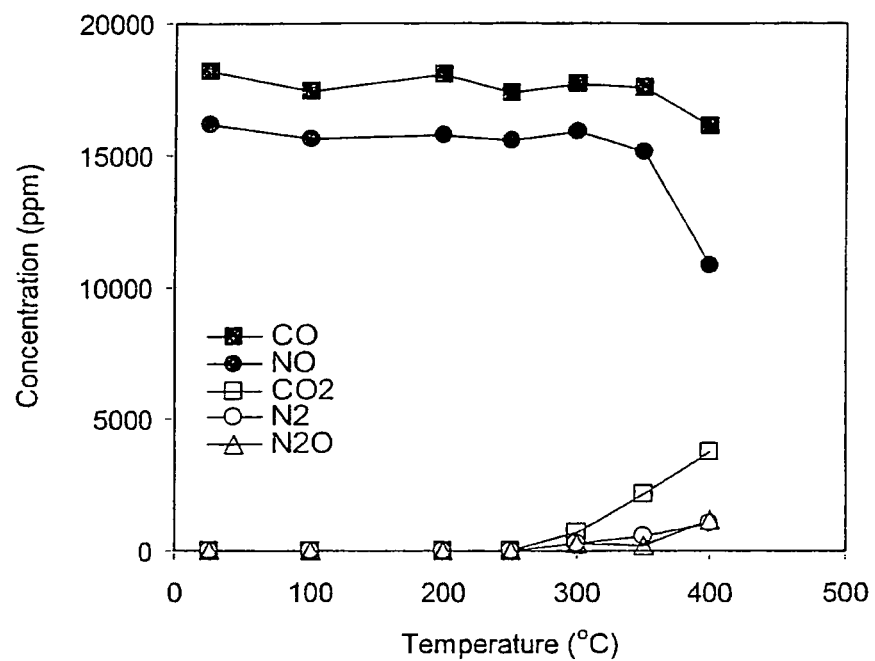
FIG. 5.1

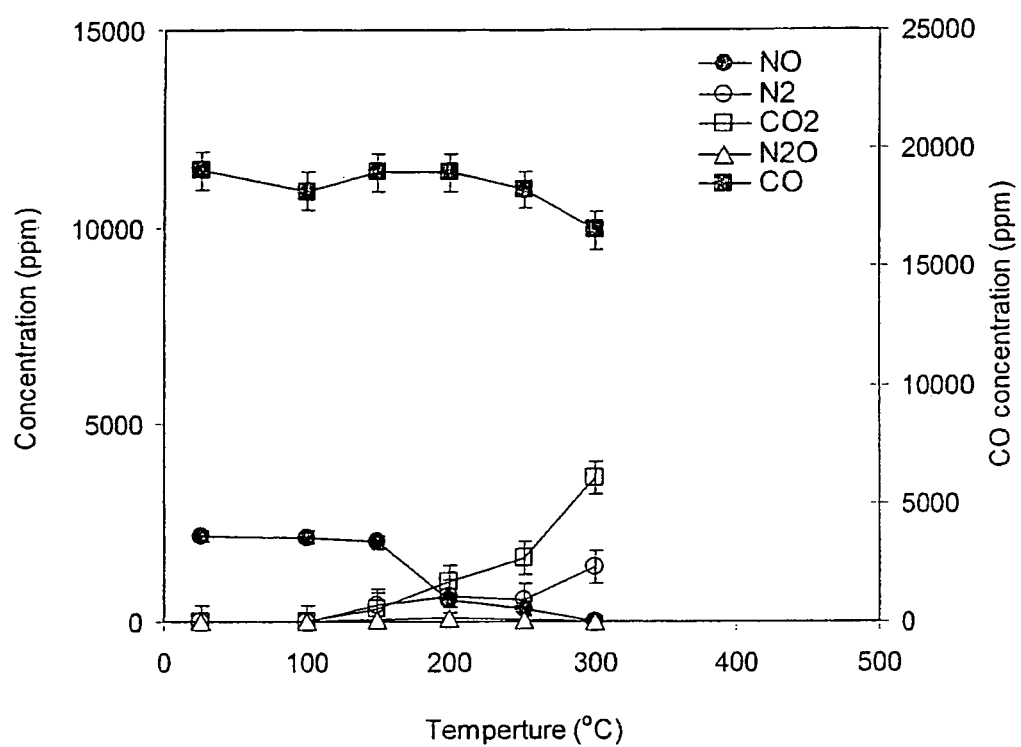
FIG. 5.2

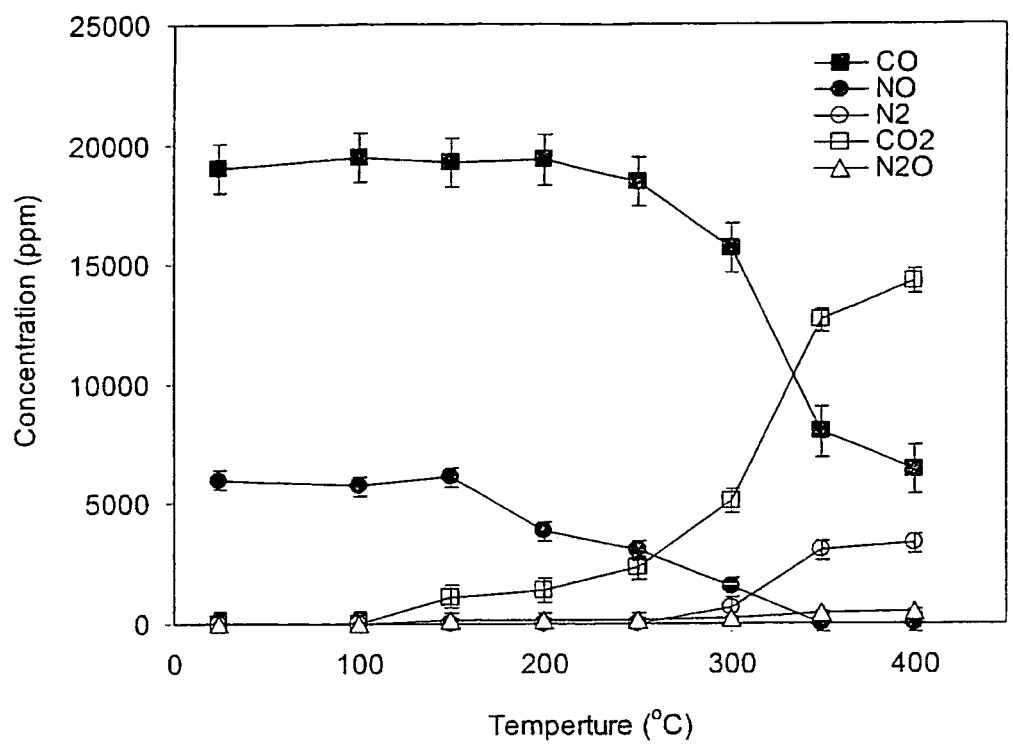
FIG. 5.3

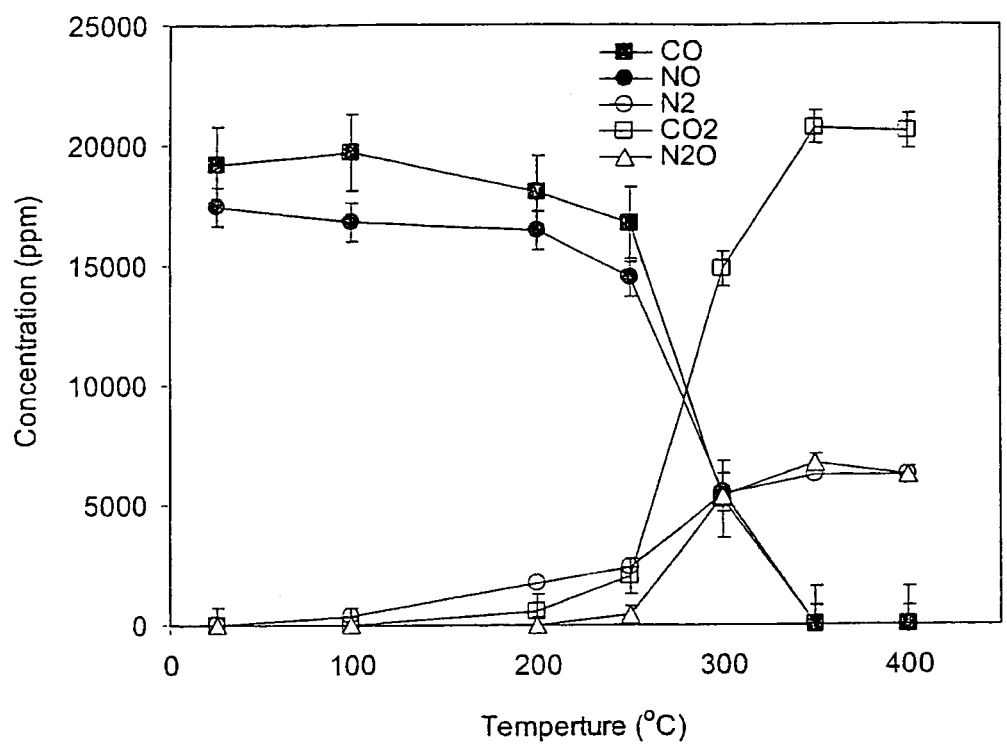
FIG. 5.4

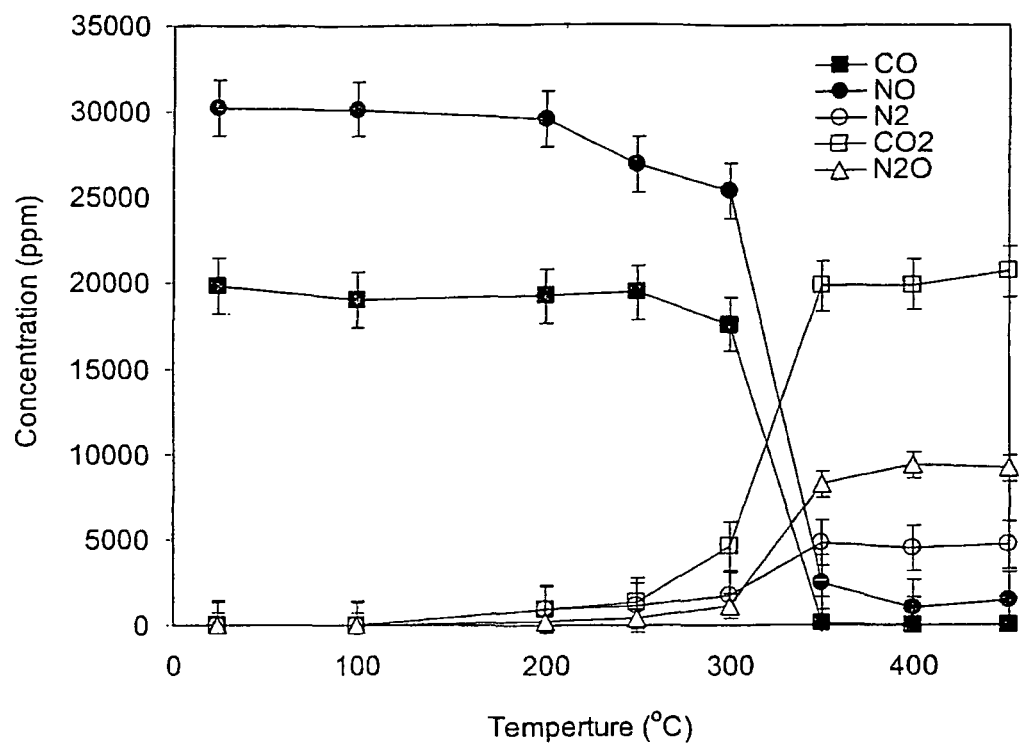
FIG. 5.5

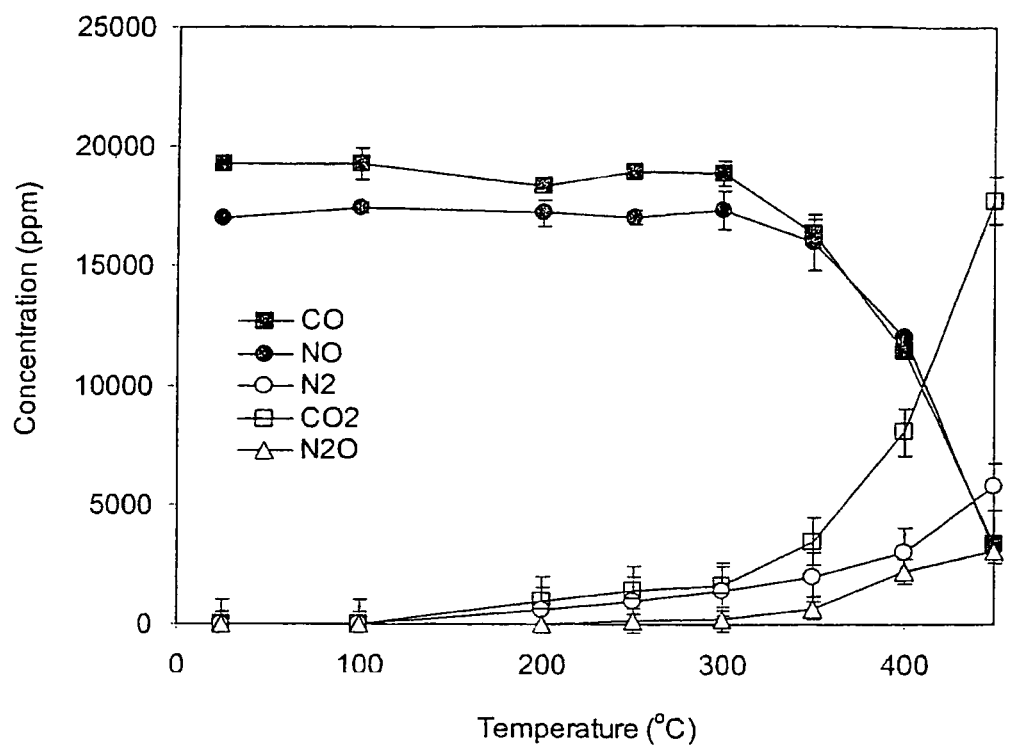
FIG. 5.6

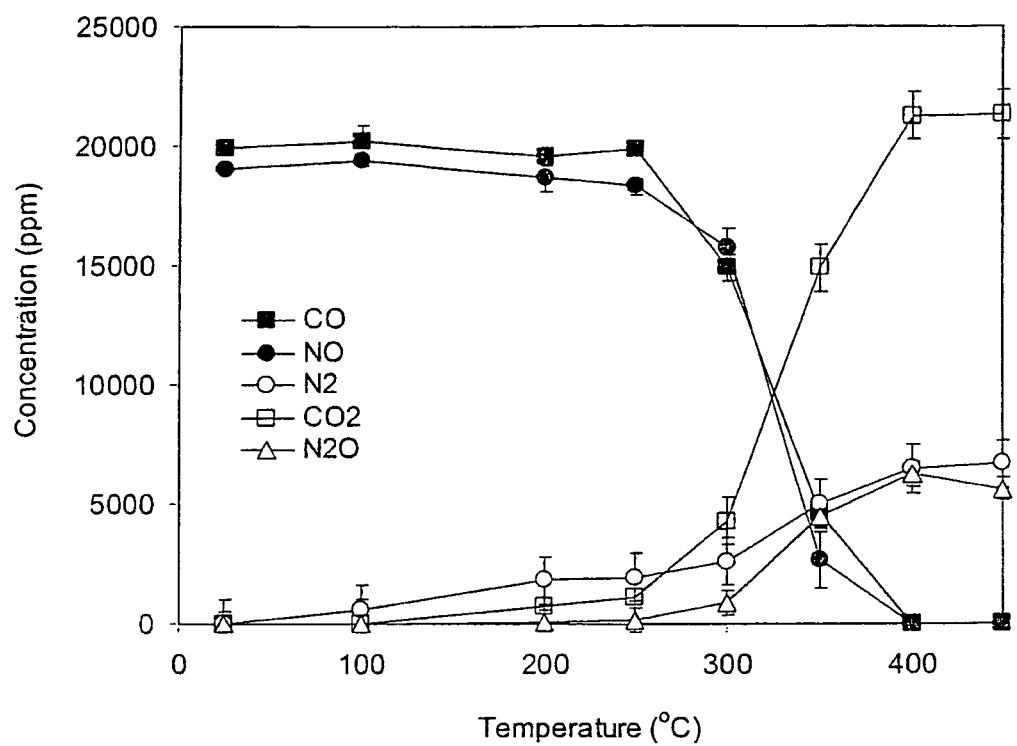
FIG. 5.7

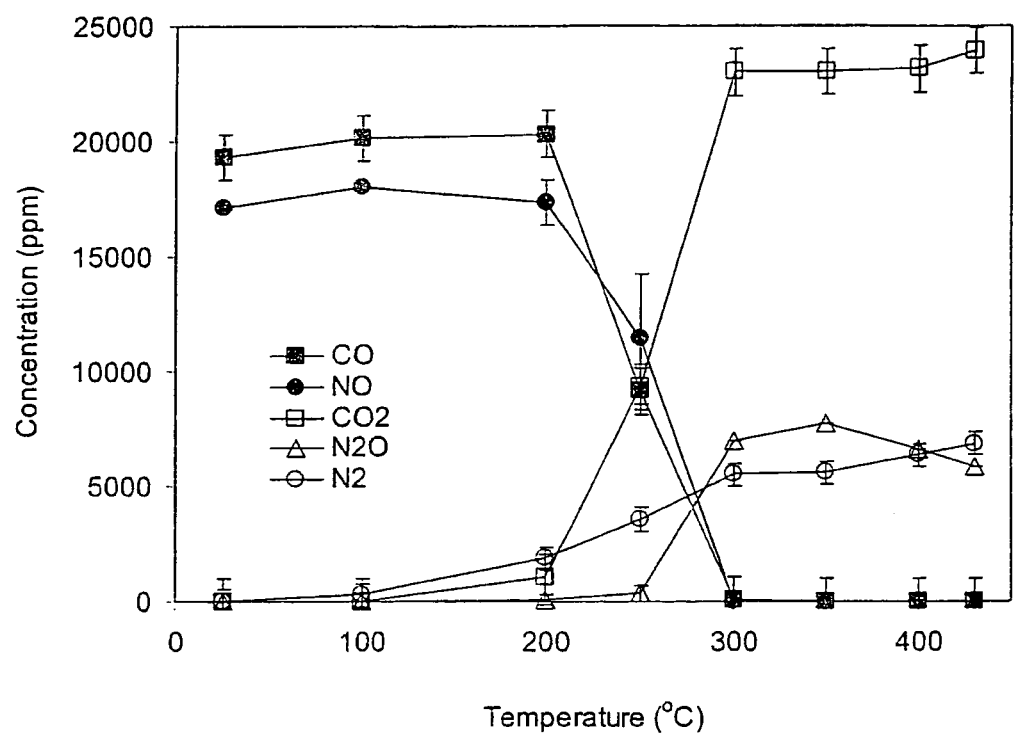
FIG. 5.8

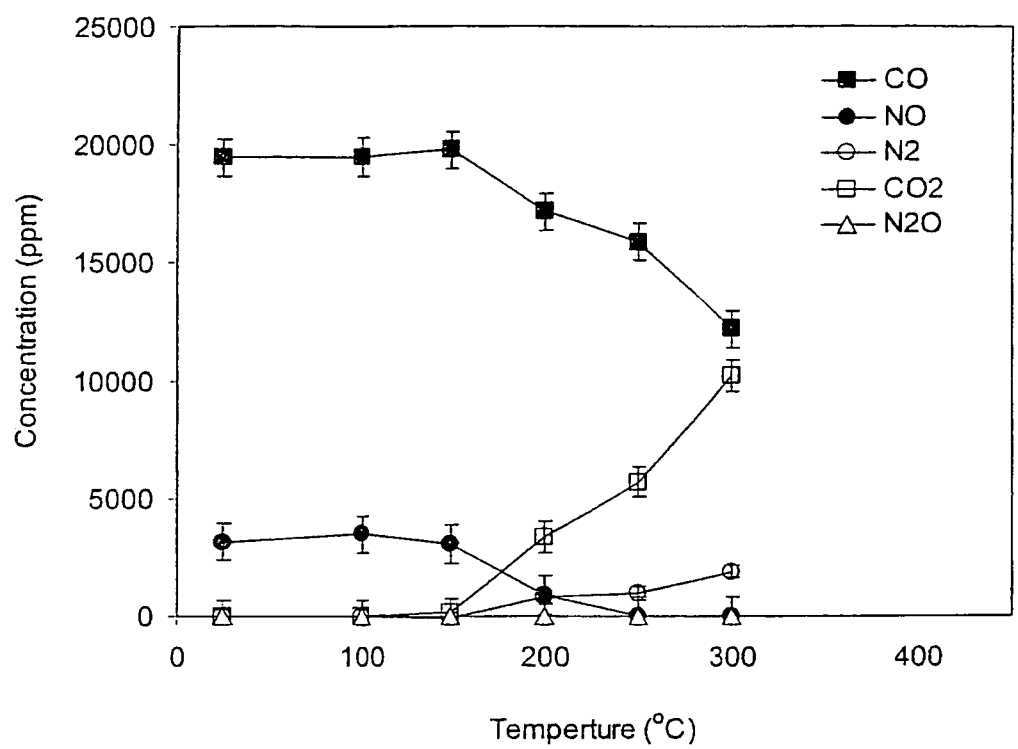
FIG. 5.9

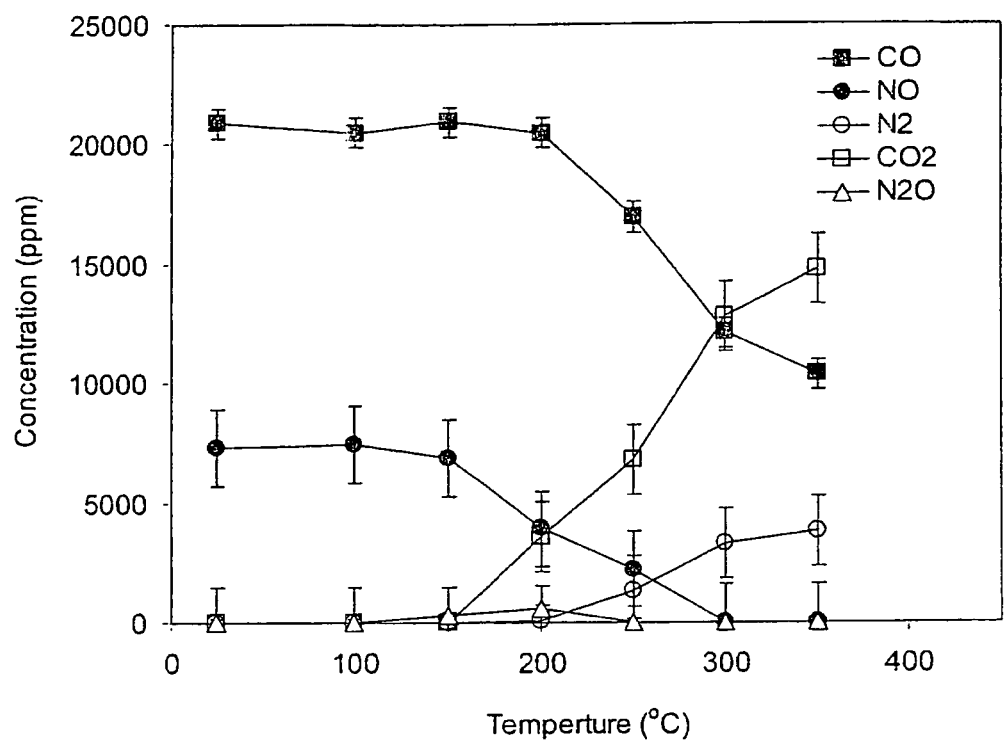
FIG. 5.10

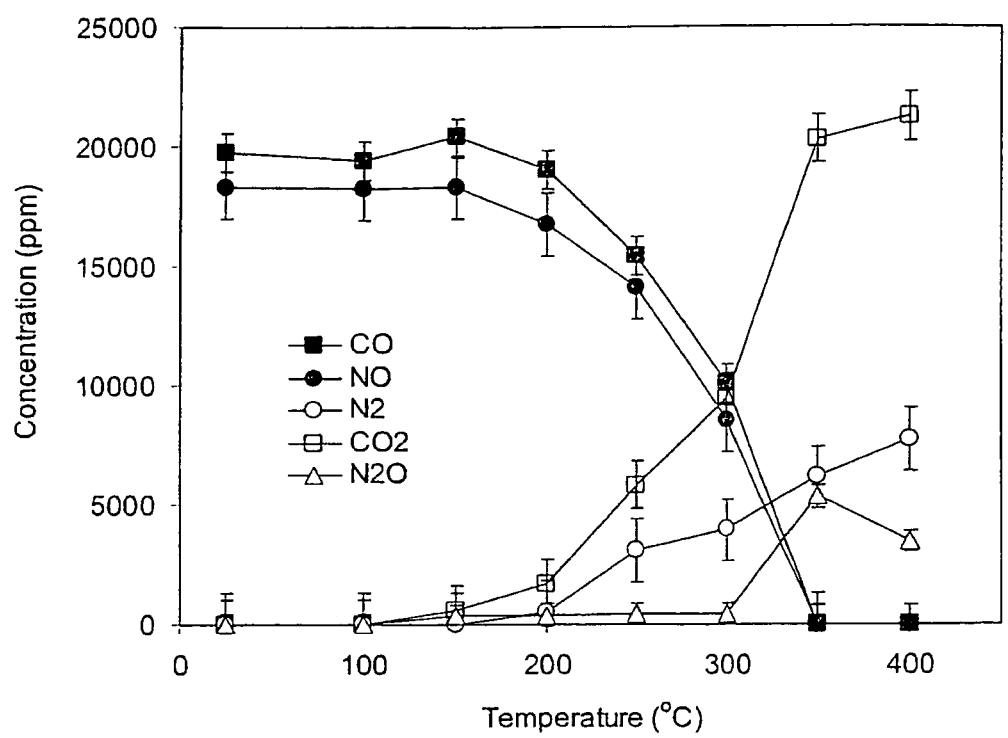
FIG. 5.11

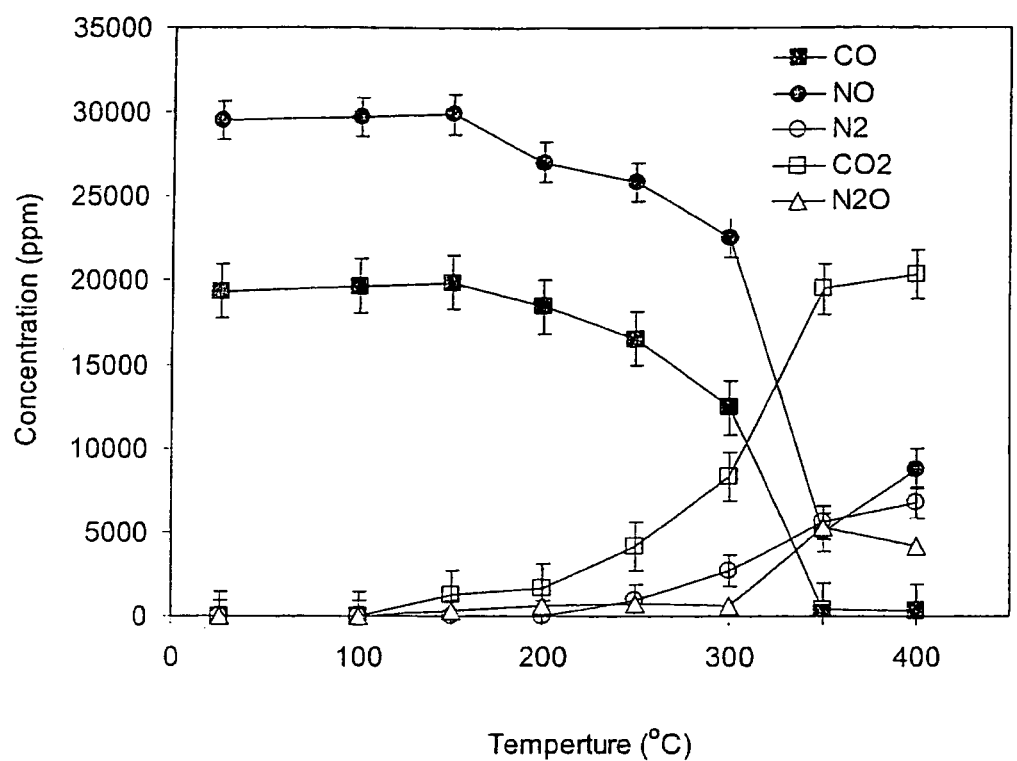
FIG. 5.12

CERAMIC NANOFIBERS CONTAINING NANOSIZE METAL CATALYST PARTICLES AND MEDIUM THEREOF

CROSS REFERENCE

This patent application claims the benefit and priority of U.S. provisional application 61/070,210, filed Mar. 20, 2008 for CERAMIC NANOFIBERS CONTAINING NANOSIZE METAL CATALYST PARTICLES AND MEDIUM THEREOF, which is hereby fully incorporated by reference.

FIELD OF THE INVENTION

The present invention relates to nanosize metal catalyst particles that are partially embedded in the surface of ceramic nanofibers. The catalyst nanofibers when supported by larger micro-size fibers form a medium that can be utilized for catalyzing various fluids.

BACKGROUND OF THE INVENTION

Heretofore, chemical production processes generally employed fluid flow as a means for introducing chemical reactants to relatively fixed catalyst pellets or to fibers coated with, the catalyst. Such catalyst pellets or fibers often fractured into particles, which deleteriously impacted processing efficiency. Not only can these particles damage processing equipment and interfere with reaction products, but ordinary environmental regulations require that they be filtered from a processing fluid prior to discharge into the environment. The fractured catalyst pellets must be replaced. Therefore, a method that avoids fracturing of catalyst materials would significantly improve the efficiency of chemical production processes.

Another problem relates to the transport rates of reactants and reaction products to and from the catalyst pellet's catalytic reaction sites wherein the catalyst pellets have dimensions ranging from a few microns to a few millimeters. Generally, chemical reactants reach a catalyst pellet's inner-surface area by traveling through the pellets' pores. However, as the size of a pellet increases, the length of its pores increases proportionally. Relatively large catalyst pellets can have pore lengths so great that all of their catalytic reaction sites are not utilized by the reactants.

U.S. Pat. No. 6,916,758 assigned on its face to The University of Akron, relates to a fibrous catalyst-immobilization system that can be employed for immobilizing catalysts that are subject to fluid flow within a chemical production process. The fibrous system is formed utilizing organic fiber forming material such as various polymers. The fibrous systems can be synthesized using electrospinning and the catalysts are secured in the fibers during the electrospinning process.

SUMMARY OF THE INVENTION

A ceramic nanofiber contains nanosize metal catalyst particles dispersed and partially embedded within the surface thereof. The fibers can be formed by electrospinning a solution comprising an aqueous (e.g. water and/or an organic solvent) component containing a catalyst precursor, ceramic precursor, and a polymer. Upon electrospinning into fibers, most of the water and/or solvent is evaporated and the polymer serves as a binder for the ceramic precursor as well as the catalyst precursor. Upon subsequent heating as by calcining, any remaining water and/or solvent is removed and the polymer is eliminated (oxidized to water and carbon dioxide) leaving only a ceramic substrate such as a fiber as well as a catalyst metal oxide. Upon reduction by a strong reducing agent such as hydrazine, or by hydrogen in the presence of heat, some catalyst can be converted to a metal per se that exists within and/or on the ceramic fiber. Such catalyst-ceramic nanofiber can be formed into a medium with the extremely thin nanofibers supported on larger fibers such as microfibers that are preferably also ceramic. The nanofibers and medium made therefrom are high temperature resistant, are chemical resistant, and -have a high degree of porosity and thus impart a low pressure drop to a fluid traveling therethrough. The catalyst-ceramic nanofiber is capable of catalyzing numerous reactions, and can be used in numerous applications such as reducing noxious gases, e.g. carbon monoxide, derived from combustion processes, and in fluid bed processes utilized in the chemical, polymer, and pharmaceutical industries. When utilized as a medium such as a filter, the catalyst nanoparticles remain intact and thus are not incorporated into the reaction medium and the need for any catalyst recovery is eliminated.

A catalyst-containing nanofiber composition, comprising: a ceramic nanofiber having a plurality of metal catalyst nanoparticles, wherein the metal catalyst nanoparticles cover from about 1% to about 90% of the surface area of the ceramic nanofiber.

A catalytic device, comprising: a support structure and a catalyst-containing ceramic nanofiber composition containing a plurality of metal catalyst nanoparticles, the nanofiber composition operatively connected to the support structure, and wherein the catalyst nanoparticles cover from about 1% to about 90% of the surface area of the ceramic nanofiber.

A process for preparing a catalyst-containing nanofiber, comprising the steps of: forming a composition comprising a catalyst precursor, a ceramic precursor and a polymer; electrospinning the composition to form a nanofiber composition; and calcining the nanofiber composition to form a catalyst-containing ceramic nanofiber composition.

BRIEF DESCRIPTION OF THE DRAWINGS

The invention will be better understood and other features and advantages will become apparent by reading the Detailed Description of the Invention, taken together with the drawings, wherein:

FIG. 5.1 is a graph showing the concentration of gases at different temperatures when no catalyst-ceramic nanofibers are utilized;

FIG. 5.2 is a graph showing the concentration versus temperature for the reaction of 2,500 ppm NO and 20,000 ppm CO utilizing $Pd/Al_2O_3$ catalyst/ceramic nanofibers;

FIG. 5.3 is a graph showing the concentration versus temperature for the reaction of 6,000 ppm NO with 20,000 ppm CO utilizing the $Pd/Al_2O_3$ Catalyst/ceramic nanofibers;

FIG. 5.4 is a graph showing the concentration versus temperature for the reaction of 18,000 ppm NO with 20,000 ppm CO utilizing the $Pd/Al_2O_3$ catalyst/ceramic nanofibers;

FIG. 5.5 is a graph showing the concentration versus temperature for the reaction of 30,000 ppm NO with 20,000 ppm CO utilizing the $Pd/Al_2O_3$ catalyst/ceramic nanofibers;

FIG. 5.6 is a graph showing the concentration versus temperature for the reaction over 0.001 g of $Pd/Al_2O_3$ catalyst/ceramic nanofibers at 1 cc/min of NO and CO;

FIG. 5.7 is a graph showing the concentration versus temperature for the reaction over 0.01 g of $Pd/Al_2O_3$ catalyst/ceramic nanofibers at 1 cc/min of NO and CO;

FIG. 5.8 is a graph showing the concentration versus temperature for the reaction over 0.1 g of $Pd/Al_2O_3$ catalyst/ceramic nanofibers at 1 cc/min of NO and CO;

FIG. 5.9 is a graph showing the concentration versus temperature for the reaction of 3,000 ppm NO and 20,000 ppm CO utilizing the $Pt/Al_2O_3$ catalyst/ceramic nanofibers;

FIG. 5.10 is a graph showing the concentration versus temperature for the reaction of 7,500 ppm NO and 20,000 ppm CO utilizing the $Pt/Al_2O_3$ catalyst/ceramic nanofibers;

FIG. 5.11 is a graph showing the concentration versus temperature for the reaction of 18,000 ppm NO and 20,000 ppm CO utilizing the $Pt/Al_2O_3$ catalyst/ceramic nanofibers; and FIG. 5.12 is a diagram showing the concentration versus temperature for the reaction of 30,000 ppm NO and 20,000 ppm CO utilizing the $Pt/Al_2O_3$ catalyst/ceramic nanofibers.

DETAILED DESCRIPTION OF THE INVENTION

Figure 1:
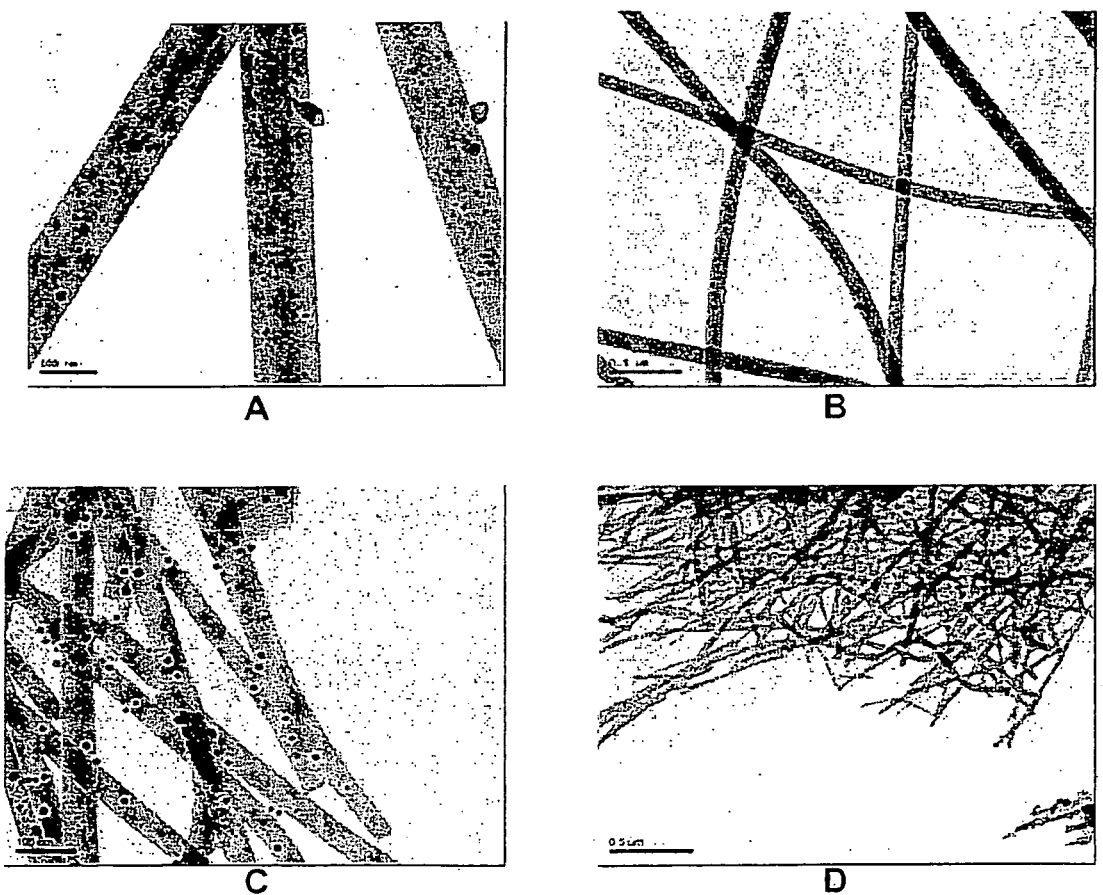
FIG. 1 relates to transmission electron microscopy (TEM) images at two different magnifications of palladium-(A, B) and platinum-(C, D) catalysts on alumina nanofibers calcined at 600° C.

Throughout the present specification, reference is made to the diameter of particles, nanofibers, and the like and the same are readily determined by a scanning electron microscope in a manner well known to the literature and to the art.

The ceramic nanofibers of the present invention are desirably made by electrospinning various solutions comprising at least one ceramic precursor, at least one catalyst precursor, as well as an organic polymer, wherein said precursors are desirably soluble in a solvent such as water and/or an organic solvent.

The ceramic precursors are generally known to the art and to the literature and include earthy raw materials often containing silicates that upon heating form whitewares such as chemical and electrical porcelain, generally all types of glass, porcelain enamels, and aluminum silicates. Other precursors include various metal salts, various metal halides; and organic metal compounds typically in the form of a metal organic ester, metal organic oxides, metal organic alcohols, and the like. Metals used to form organic oxides, organic alcohols, and halides include Indium, lead, germanium, gallium, erbium, cadmium. Still other suitable metal compounds include aluminum, calcium, zirconium, manganese, titanium, tungsten, zinc, cerium, calcium, tin, lanthanides, actinides, or other transition metal elements. Materials with similar high temperature and chemical resistance may also be suitable such as silicon (to form $SiO_2$ and SiC) and carbon. Preferred ceramic precursors contain one or more of aluminum, titanium, zinc, and silicon. The ceramic precursor can be in any form such as a monolithic structure, particles, such as microparticles or nanoparticles, granules, pellets, or the like.

Metal salts can be utilized as a ceramic precursor but are not desired since they are generally insoluble in the precursor solution.

Examples of metal halide precursors include metal chlorides and metal fluorides.

Metal organic ester precursors are preferred such as formate, acetate, isopropoxide, ethoxide, and the like because they are soluble in polymer solutions such as poly(vinylpyrolidone) (PVP), ethanol, and water.

Examples of various ceramic organic oxide precursors include oxides containing from 1 to about 12 carbon atoms such as methoxide, ethoxide, n-propyloxide, isopropoxide, and various derivatives thereof such as ethylhexanoisopropoxide, butoxide, and the like.

Examples of suitable organic alcohol precursors contain from 2 to about 12 carbon atoms such as ethanol, propanol, isopropanol, butanol, isomers thereof, and the like.

The various ceramic precursors set forth above preferably are different than the various catalyst precursors set forth below so that when a ceramic is formed as a substrate, for example a fiber, the various catalysts are formed in a small amount thereon and/or therein. An exception is when a catalyst is formed as a substrate per se, for example a thin fiber.

Catalyst precursors are desirably utilized that are soluble in the organic solvent or water. Such catalyst precursors are well known to the art and to the literature. Suitable catalyst precursors include noble or precious metal catalysts per se, various metal catalysts in the form of a salt such as a silicate, an oxide, or an organic ester, for example an acetate, an acetylacetonate, or a halide, and the like. The catalyst precursors can generally be of any size and shape such as particles, microparticles, granules, and the like. Examples of noble or precious metal catalysts include gold, silver, platinum, palladium, iridium, ruthenium, rhodium, and osmium, and any combination thereof. An example of a palladium precursor catalyst is Pd cyclooctadiene chloride (dichloro($n^4$-1,5-cyclooctadiene) palladium(II) otherwise known as $PdCl_2(C_8H_{12})$). The cyclooctadiene chloride compounds are also available for Pt and Rh catalysts. Other metal catalysts include vanadium, chromium, molybdenum, manganese, iron, cobalt, nickel, copper, and zeolites, and combinations thereof. The size of the various catalysts precursors are not important so long as they are generally small, that is an average diameter of from about 0.1 nanometer to about 1 micron, desirably from about 0.5 to about 200 nanometers, and preferably from about 1 to about 20 nanometers. On formation of the ceramics such as by electrospinning, the various catalyst generally exist in the form of a metal oxide.

The amount of catalyst precursor is generally from about 1 to about 50 parts by weight, desirably from about 1 to about 25 parts by weight, and preferably from about 1 to about 15 parts by weight based on 100 parts by weight of the ceramic precursor. The amount of the noble or precious metal catalyst particles per se is generally from about 1 to about 50 parts by weight, desirably from about 1 to about 25 parts by weight, and preferably from about 1 to about 15 parts by weight based upon 100 parts by weight of the ceramic precursor.

When the noble or precious metal catalyst salts, such as palladium chloride, are a metal per se, they generally are not soluble in a solvent and generally have to be dispersed therein, such as through mixing, before the electrospinning process so that they are generally randomly dispersed throughout and partially embedded in the ceramic precursor after spinning. The formation of elemental metal catalyst particles is known to the art and to the literature. For example, a metal salt can be mixed with potassium hydroxide, a surfactant or stabilizer, potassium tartrate, and water. The mixture can then be refluxed to yield metal nanoparticles. The metal particles can then be mixed with a polymer solution and a ceramic precursor and then spun under heat to yield a metal nanoparticles doped nanofiber. The metal catalyst will then generally be in the form of a noble or precious metal oxide, after heating in air to sufficiently high temperature of about 200° C. to 1,200° C.

An alternative route is when it is desired that the ceramic nanofibers of the present invention contain a noble or precious metal per se catalyst, the same can be formed by electrospinning a ceramic precursor with a polymer to form a ceramic nanofiber, and then adding the noble or precious metal catalyst to, the surface of the ceramic nanofiber in any conventional manner (such as wet laying) as by utilizing a small amount of binder, and the like. Wet laying can be accomplished with a metal or a metal slat. The binder holds the metal/metal salt onto the fiber surface.

Examples of suitable catalyst precursors include chromic oxide, copper salts, ferric chloride, iron oxide, molybdenum oxide, vanadium pentaoxide, palladium chloride, palladium acetate, palladium acetylacetonate, platinum chloride, gold acetate, palladium chloride, platinum chloride, rhodium chloride, zeolite, and the like. Preferred catalyst precursors include acetates and chlorides of the various metal catalysts.

One or more catalyst precursor particles can be added to an electrospinning solution or precursor composition so that the formed nanofibers contain, of course, one or more catalysts that are different. The utilization of variegated or different catalysts result in a multipurpose catalyst system or universe wherein several different reactions can occur simultaneously and/or subsequently, or wherein the same catalyst-nanofiber can be utilized to react subsequent compounds, or subsequent flow streams added to the catalyst-ceramic nanofiber.

Any suitable organic polymer can be utilized in the process with high molecular weight polymers being desired so that the resulting solution is very viscous. In general, the organic polymer should be compatible with catalyst precursor and capable of being dissolved by the solvent. The organic polymer should also be capable of being eliminated, i.e. oxidized to water and carbon dioxide, during a subsequent heating or calcining step. Suitable organic polymer materials include, but are not limited to, polyacrylonitrile (PAN), polyesters such as polyethylene terephthalate (PET) and polycaprolactone (PCL), polystyrene, poly(2-hydroxyethyl methacrylate), polyvinylidene fluoride, poly(ether imide), styrene-butadiene-styrene triblock copolymer, poly(ferrocenyldimethylsilane), polyethylene oxide (PEO), Rayon, Teflon, DNA (deoxyribonucleic acid), segmented polyether urethane, various nylons, elastomeric polyurethane urea copolymers, biopolymers, e.g. poly(lactic acid), tetraethyl benzylammonium chloride (TEBAC), poly(vinylpyrrolidone) (PVP), polycaprolactone, poly(vinyl acetate) (PVAc), polycarbonate, poly(vinyl alcohol) (PVA), cellulose acetate (CA), polyacrylic acid (PAA), or polyurethane (PU), and blends thereof. Preferred polymers include PVP, PEO, and Nylon 6. It should be understood that other polymeric materials can also be used as known to the literature and to one skilled in the art.

With respect to the organic polymer, while the amount thereof generally can be as high as 300 parts, desirably the amount thereof is from about 10 to about 300, desirably from about 10 to about 100; and preferably from about 10 parts to about 20 or 25 parts by weight for every 100 parts by weight of the ceramic precursor.

Suitable solvents are known to those skilled in the art and depend, in part, on the ceramic precursor, on the organic polymer, and on the catalyst precursor. Solvents include water and/or organic solvents such as N,N-dimethylformamide (DMF); $C_1$-$C_5$ alcohols such as ethanol, methanol, or isopropanol; $C_3$ to $C_8$ ketones such as acetone; tetrahydrofuran (THF); methylene chloride (MC or dichloromethane); or $C_1$ to $C_{12}$ carbocylic acids such as formic acid or acetic acid; or any combination thereof. It is to be understood that other solvents can also be used.

An important aspect with regard to the electrospinning solution comprising the ceramic precursor, the organic polymer, the catalytic precursor or metallic catalyst, and the solvent is that a viscous solution is formed, and that the components are compatible with regard to the electrospinning process. Accordingly, the amount of solvent can generally range from about 500 to about 2000, desirably from about 500 to about 1500, and preferably from about 800 to about 1000 parts by weight per every 100 parts by weight of the polymer plus ceramic precursor plus catalyst precursor.

Once the ceramic precursor along with the catalyst precursor, the organic polymer and the solvent have been electrospun to form nanofibers, they are subsequently calcined, generally to an oxide, to form a ceramic fiber. Examples of ceramic nanofibers that can be produced according to the present invention include oxides of the above-noted of aluminum, titanium, nickel-titanium, magnesium titanium, silicon calcium, zirconium, tin, chromium, tungsten, zinc, or any combination thereof. A list of specific ceramics produced by an electrospinning process along with suitable organic polymers and suitable solvents are set forth in Table 1. Preferred ceramics of the present invention include alumina, titania, zinc oxide, silica, and the like.

The ceramic nanofibers of the present invention can be prepared by any suitable method including the gas jet method. Preferably, an electrospinning method is utilized and the same is known to the literature as well as to the art and a general description thereof is set forth in U.S. Pat. No. 6,753,454; in WO 2005/024101 A1, in "Polymer Nanofibers Assembled by Electrospinning", Frenot et. al, Current Opinion in Colloid and Interface Science 8(2003), 64 75; and "Nanostructured Ceramics by Electrospinning", Ramaseshan et al, Journal of Applied Physics 102,111101 (2007); all of which are hereby fully incorporated by reference. In some methods of the invention, the polymer solution is prepared by dissolving the organic polymer and the catalyst precursor (e.g., a catalyst metal salt) in a suitable solvent. The blend is mixed to ensure homogeneous distribution of the polymer and catalyst precursor in the solvent. For example, an ultrasonic mixing technique can be used. In other methods, this mixing step occurs. at elevated temperatures (e.g., between about 40° C. and about 80° C.) for a desired time (e.g., about 0.5 hours to about 2 hours) to promote dissolution. Subsequently, the ceramic precursor is added and mixed.

In still another method, it is preferable to dissolve the catalyst precursor (e.g., a catalyst metal salt) in the solvent prior to adding the organic polymer and the ceramic precursor. This order of addition can prevent the organic polymer from cross-linking during the mixing step.

In a further method of the invention, the catalytic precursor can be solid particles of a catalytic material (e.g., a metal oxide). In this embodiment, the solid catalyst precursor particles can be dispersed in the polymer solution that includes the solvent, the dissolved organic polymer, and the dissolved ceramic precursor.

Table A relates to a list of various ceramic precursors, and to various solvents (s) and organic polymers that can be utilized to form, after calcining, the indicated ceramic nanofiber. In some applications a catalyst precursor can be used as the support structure for another catalyst to make a multiple catalyst medium. In other applications, only a catalyst precursor is utilized to make a catalyst medium as in the form of a fiber.

TABLE A

| Ceramic Nanofiber | Ceramic Precursor, polymer | Comments |
|---|---|---|
| $Al_2O_3$—$B_2O_3$ | 1. Aluminum acetate<br>2. Boric acid, $H_2O$, (s), PVA | Aging for 5 h before espinning |
| $NiFe_2O_4$ | 1. Iron(III)ethylhexanoisopropoxide<br>2. Nickel ethylhexanoisopropoxide<br>3. Acetic acid, or isopropanol, (s) PVP | Sol-gel; espinning in glove box; hydrolysis after spinning |
| $Al_2O_3$ | 1. Aluminum di-sec-butoxide<br>2. Ethanol, $H_2O$ (s) + HCl | Aged sol; α-alumina formed |
| $Co_3O_4$ Support Catalyst | 1. Cobalt acetate<br>2. $H_2O$ (s), PVC | Sol-gel |
| $MgTiO_3$ | 1. Magnesium ethoxide, titanium isopropoxide, 2-methoxyethanol,<br>2. PVAc in DMF (s) | Sol solution preparation first, then polymer solution addition |
| $NiTiO_3$ Support Catalyst | 1. Nickel acetate, ethanol, $HNO_3$,<br>2. Titanium isopropoxide<br>3. PVAc in DMF (s) | Sol solution preparation first, then polymer solution addition |
| $ZrO_2$ | 1. Zirconium oxychloride<br>2. PVA, $H_2O$ (s) | Sol-gel |
| $Mn_2O_3$—$Mn_3O_4$ Support Catalyst | 1. Manganese acetate<br>2. PVA $H_2O$ (s) | Sol-gel; calcinations controlled phase formation |
| $TiO_2$ | 1. Titanium butoxide<br>2. P-123 (EO-PO-EO) copolymer | Sol-gel; mesoporous fibers below 700° C. anatase, <700° C., anatase and/or rutile |
| $SnO_2$ | 1. Dimethyldineodecanoate tin<br>2. PEO, $CHCl_3$ | Sol-gel, rutile form |
| $CeO_2$ | 1. Cerium nitrate<br>2. PVA, $H_2O$ (s) | PPT (coprecipitation) |
| $TiO_2$ | 1. Titanium isopropoxide<br>2. PVP | Sol-gel; core-shell, removal of mineral oil give hollow fibers; $TiO_2$ having core (magnetic nanoparticles), dyes, etc. |
| $TiO_2$ | 1. Titanium isopropoxide, PVP<br>2. Polystyrene, DMF-THF (s) | Sol-gel; highly porous fibers |
| $SiO_2$ | 1. Tetraethylorthosilicate, ethanol<br>2. HCl | Sol-gel |
| AlN coated $SiO_2$ | 1. Tetraethylorthosilicate, ethanol | $SiO_2$-nanofiber coated with AlN |
| $Ca_{10}(PO_4)_6(OH,F)_2$ | 1. $Ca(NO_3)_2$, ethanol, $H_2O$<br>2. $P(C_2H_5O)_3$ | 24 h aging for 10 days, then addition of $NH_4F$ |
| $TiO_2$ | 1. Titanium isopropoxide<br>2. PVP, ethanol (s) | Sol-gel, elastic moduli of the nanofiber studied |
| ZnO | 1. Zinc acetate, PVP, ethanol | Sol-gel |
| $Cr_2O_3$ Support Catalyst | 1. Chromium chloride, PVP | In situ gelation, $NH_3$ treatment |
| $WO_3$ | 1. Tungsten powder, 30% $H_2O_2$<br>2. PVP, ethanol (s) | Tungstenic acid preparation first, then polymer, solvent addition |
| $WO_3$ | 1. Tungsten isopropoxide<br>2. PVAc, DMF (s) | Sol-gel chemistry, ammonia sensing |
| $ZnO_2$ | 1. Zinc acetate, PVAc, $H_2O$ (s) | Sol-gel |
| $TiO_2$ | 1. Titanium propoxide PVAc | |
| $TiO_2$ | 1. Titanium isopropoxide | Sol-gel, without addition of polymer |
| $TiO_2$ | 1. Tetraisopropylorthotitanate | Highly porous material |
| $CeO_2$—$ZrO_2$ | 1. Ceric nitrate<br>2. Zirconyl oxychloride, PVP | Sol-gel |
| $In_2O_3$ Support Catalyst | 1. Indium nitrate | Sol-gel |

A specific electrospinning process will now be set forth to illustrate the invention, it being understood that variations of conditions such as amounts, temperature, time, etc., as well as other processes and techniques can also be utilized.

An electrospinning ceramic solution containing 0.888 gram by weight of an aluminum organic ester ceramic precursor, that is aluminum acetate, and 0.91 gram by weight of poly(vinyl pyrrolidone) [polymer] were mixed in the presence of 20 grams by weight of solvent (40 wt % ethanol in water). 0.07 gram of palladium chloride ($PdCl_2$) [catalyst precursor] was dissolved in resulting mixture and mixed overnight at 40° C. using a magnetic stirrer. The precursor solution was added to a 3 ml glass syringe having a stainless steel needle at the end thereof. The solution was pumped at 3.0 milliliters per minute using a syringe pump and a steel needle was positioned about 20 centimeters above a grounded aluminum foil collector. A negative 20 kilowatt charge was applied to the needle while the aluminum foil was grounded. A drop of the polymer mixture formed at the end of the needle. The electrical forces overcame the surface tension forces and a jet of the polymer mixture left the drop and was drawn to the grounded aluminum foil. The polymer jet carried with it the ceramic precursor and catalyst precursor. During this process, the solvent was either evaporated and/or flashed off. The diameter reduction of the fiber from the syringed needle to the collector foil was on a magnitude of 5 orders. The resulting deposited nanofiber had an average diameter of from about 100 to about 200 nanometers and contained a random mixture of the ceramic precursor, the organic polymers, with the catalyst precursor being dispersed within as well as exposed, that is partially embedded in the nanofiber.

Either the extruder nozzle, i.e. the needle and/or the grounded metal plate, can be continuously moved so that the nanofiber is not deposited on one spot to form a clump or a mass of material, but rather to retain the shape of the fiber whether it be a specific pattern or otherwise.

The nanofiber composition was heat treated by calcining to convert the ceramic precursor to an oxide, to eliminate the organic polymer by converting it to water and carbon dioxide, and to convert the catalyst precursor to an oxide. Thus, the above-noted ceramic precursors are generally converted to oxides of the metal, that is to indium oxide, lead oxide, germanium oxide, gallium oxide, erbium oxide, cadmium oxide, aluminum oxide, calcium oxide, zirconium oxide, manganese oxide, titanium oxide, tungsten oxide, zinc oxide, cerium oxide, calcium oxide, tin oxide, oxides of the various lanthanides, oxides of the various actinides, and oxides of various transition metals. If elemental catalyst metal or alloy metal particles are utilized, they may or may not be converted to an oxide depending upon the catalyst. Thus, the above-noted catalytic precursors are generally converted to oxides thereof that is, of noble or precious metals such as gold oxide, silver oxide, platinum oxide, palladium oxide, iridium oxide, ruthenium oxide, rhodium oxide, and osmium oxide, as well as vanadium oxide, chromium oxide, molybdenum oxide, manganese oxide, iron oxide, cobalt oxide, nickel oxide, copper oxide, and oxides of the various zeolites. The calcining temperature will vary depending upon the type of ceramic precursor, catalyst precursor, and the polymer but generally can range from about 200° C. or about 500° C. to about 1200° C., desirably from about 500° C. to about 800° C., and preferably from about 600° C. to about 700° C. Calcining times can range from about 0.5 to about 6, and desirably from about 1 to about 2 hours. During the calcining step, the fiber is often shrunk, but the shape thereof is retained. Also during this step, it has been found that the formed metal oxide catalyst generally migrates to the surface of the microfiber because of phase separation. That is, the small diameter of the nanofiber allows the catalyst oxide to move more freely to the fiber surface than may occur with larger, thicker, alumina support structures. The metal oxide catalyst concentration and the rate of heating determine the size of the metal oxide catalyst particles.

After the calcining step, the nanofibers are optionally subjected to a selective chemical reduction step either at low or ambient temperatures, or elevated temperatures in the presence of a selective reducing agent to reduce the typical metal oxide catalyst to an elemental metal catalyst or to a metal alloy, but not to reduce the ceramic oxide fiber. Low or ambient temperature reducing agents include, various alcohols having from 1 to 12 carbon atoms, such as methanol or ethanol or polyethylene glycols, or strong amine compounds such as hydrazine. Low or ambient temperature reduction generally occurs at temperature ranges of from about 5° C. to about less than 500° C., desirably from about 5° C. to about 40° C. or about 100° C.; and more desirably from about 15° C. to about 30° C. for generally about 2 to about 48 hours, desirably from about 10 to about 30 hours, and preferably from about 15 to about 25 hours desirably with stirring. Elevated temperature reductions generally utilize hydrogen and temperatures that range from about 500° C. to about 1200° C., and desirably from about 550° C. to about 800° C. for generally about 0.5 to about 6 hours and desirably from about 1 to about 4 hours. It is an important aspect of the reduction step that the reduction temperature be within a suitable range so, as noted above, to reduce the catalyst oxide to a metal element but yet retain the chemical nature, i.e. no reduction, of the ceramic oxide fiber. The ambient or elevated temperature reduction of the metal and/or metal alloy oxide will vary from catalyst to catalyst.

The catalyst on and within the ceramic substrate such as various nanofibers, if not reduced will be the above-noted oxides of the noble or precious metals as well as the other metals. If reduced, the catalysts on the ceramic substrate such as nanofibers will generally be metals or elements such as the noble or precious elements set forth above that include gold, silver, platinum, palladium, iridium, ruthenium, rhodium, and osmium, and any combination thereof. Further metal catalysts on the ceramic substrate include vanadium, chromium molybdenum, manganese, iron, cobalt, nickel, copper, and zeolites, as well as any combination thereof.

The calcined and reduced nanofibers have an average fiber diameter of from about 1 to about 500 nanometers, desirably from about 5 or about 25 to about 250 nanometers, and preferably from about 50 to about 100 nanometers, and the average diameter size of the metal catalyst or metal oxide catalyst particles is from about 0.1 to about 500, desirably from about 0.5 to about 200, and preferably from about 1 to about 15 nanometers as determined by a scanning electron microscope or a transmission electron microscope. The ratio of the surface area to the volume of the nanofibers is quite high. The ratio of surface area to volume of fiber is approximately 4/D. A 1 nm fiber thus has an area/volume ratio of $4 \times 10^9$ m, and a 100 nm fiber has an area/volume ratio of $4 \times 10^7$. Common textiles having diameters of about 100 microns or larger have an area/volume ratio of $4 \times 10^4$ or smaller. Thus, the ratio of surface area to volume of nanofibers of the present invention ranges from about $0.4 \times 10^9$ m to about $4,000 \times 10^9$ m ($4 \times 10^{12}$ m). After preparation, the nanofibers can be coiled or otherwise collected for subsequent use.

A distinct advantage of the catalyst-ceramic nanofibers of the present invention is that the catalyst exists as dispersed particles or phases partially embedded in the nanofiber, and also within the nanofiber, and thus the nanofiber is free of a continuous catalyst coating thereon. The amount of nanofiber surface area covered by the exposed catalyst of the present invention can vary over a wide range but typically is small. Surface area coverage can be from about 1% to about 90%, or from about 1% to about 75%, desirably from about 1.5% to about 60%, or from about 1.5% to about 45%, or from about 1.5% to about 30%, or preferably from about 2% to about 15%, or from about 2% to about 10% based upon the total surface area of the nanofiber. Such small amounts of catalyst result in considerable cost savings in comparison to various prior art coating techniques.

The catalyst-ceramic microfibers can be formed into various different, effective, and efficient porous structures such as one or more woven or non-woven layers, mats, webs, membranes, and the like, so that upon the passage of a fluid therethrough, the exposed catalyst on a nanofiber will cause various chemical and/or biological reactions such as sterilization, eradication, conversion, and the like.

The method or formation of making the various filter or converter structures of the catalyst-ceramic nanofiber medium can be any desired manner such as simply by laying fibers on top of one another, weaving various nanofibers and support structure fibers, or mixing the nanofibers with microfibers in a slurry and vacuum forming the fibers into a layer, mat structure, membrane, etc, and the like. A desired method is to make a slurry of a catalyst-ceramic nanofibers by placing the same in water along with reinforcing or support fibers and subsequently adding a binder and optionally other desired additives, to a mold and draw a vacuum to remove the water and form the medium such as a mat, a web layer, and the like.

Support material, while not necessary, is very desirable to reinforce the catalyst-ceramic nanofiber so that a catalyst-nanofiber medium is formed, e.g. a filter, that does not break due to the flow of fluid therethrough. Generally any suitable support or reinforcement materials can be utilized such as various microfibers having an average diameter of from about 1 micron to about 1 or about 5 millimeters, and desirably from about 5 microns to about 20 or about 50, or about 100 microns. The support or reinforcement fiber material can be any conventional material such as a ceramic fiber, a glass fiber, a metal fiber, high resistant plastic or polymer fibers, and the like. Examples of specific support fibers include various ceramic microfibers such as alumina microfibers, titania fibers, and the like. Glass fibers include sodium glass, E-glass, B-glass, and the like. Metal fibers utilized are those that do not impart adverse effects to the reaction and can include iron, aluminum, steel, brass or bronze, and the like. Various thin metal, polymer or ceramic meshes, webs, or nets can also be utilized. The support fibers can be generally located anywhere within the catalyst-ceramic nanofiber medium or filter including at the fluid flow entrance of the medium, as well as randomly throughout, but is desirably located at the fluid flow exit of the filter. Examples of such include hollow cylinders as for air treatment, pleated cylinders similar to oil filters on automobiles, and the like. Another specific example is a hollow cylinder wherein the walls thereof contain the catalyst-ceramic nanofibers with support materials being located either therein, on the external surface thereof, or on the internal surface thereof, depending upon the direction of flow of the fluid such as a noxious gas therethrough. Another desired embodiment is a cylinder wherein the support material is a solid, preferably non-porous, for example a sheet of metal or ceramic with the catalyst-ceramic nanofiber medium or filter being located on either the internal or surface if the fluid flows through the internal regions of the cylinder, or located on the exterior surface of the solid cylinder if the fluid material flows past the exterior surface of the cylinder.

As noted, the catalyst-ceramic nanofiber medium or filter is porous such that only a low pressure drop of the fluid therethrough occurs. The pressure drop through a porous material depends upon the flow rate, thickness of the material, viscosity of the fluid, and the area of flow. The resistance to the flow is the inverse of the permeability as defined by Darcy's Law (Christie j. Geankoplis, Transport Processes and Unit Operations $3^{rd}$ ed., Prentice Hall, Englewood Cliffs, N.J., 1993).

$$\frac{Q}{A} = \frac{k}{\mu}\frac{\Delta P}{L}$$

Where Q (m$^3$/s) is the flow rate, A (m$^2$) is the filter area through which the fluid flows, k (m$^2$) is the permeability, $\mu$ (kg/m/s) is the fluid viscosity, $\Delta P$ is the pressure drop (N/m$^2$), and L (m) is the filter thickness.

While the pressure drop can vary greatly, desirably the filter or catalyst-ceramic nanofiber medium has permeabilities of generally $10^{-11}$ m$^2$ or greater, and desirably $10^{-10}$ or greater. The porosity of the filter or medium is generally high, such as about 0.8 or greater, desirably about 0.9 or greater, and preferably at least about 0.94 or greater.

A plurality of catalyst-ceramic nanofiber media or filters can be located within a fluid flow stream such as a conduit that is a pipe, duct, tube, channel, a continuous reaction vessel, etc. The shape of the conduit can generally be any selected shape such as circular, square, rectangular, and the like. Numerous different arrangements or structures can thus exist for reacting compounds. For example, each of the plurality of filters or media can have one or more different catalysts, or two or more such media can have a common catalyst, or different fluids can be added at different locations of the fluid flow stream, and the like. Thus, numerous types of treatments of various fluids exist such as one filter or medium catalyzing one reaction, a second filter or medium catalyzing a second reaction, etc., or one single medium or filter containing a plurality of catalysts therein catalyzing two or more different reactions, and the like. Still further, different fluids can be added at different locations in the fluid flow stream, and the like.

It should thus be apparent that a myriad of different types of fluid reaction systems can be utilized to treat various fluids such as noxious gases, or to cause one or more chemical reactions, one or more biological reactions, one or more monomer or polymer reactions, or one or more pharmaceutical reactions, or the like. Some of the advantages of the present invention thus include the following:

Advantages:

1. Easy recovery of the catalyst-nanofiber medium after use.

2. Nanofibers provide higher surface area than microfibers. Thus, the catalyst-nanofiber medium will have improved performance over similar microfiber materials due to their higher surface area to volume ratios and large length to diameter ratios.

3. Multiple catalyst-nanofiber medium can be applied to a fluid by adding a plurality of media such as filters or disks each containing one or more different catalysts.

4. Various reactions can sequentially occur by using a series of catalyst-nanofiber media each containing a different catalyst or by using one or more such media containing multiple catalysts.

5. The concentration of catalyst can be controlled by adjusting the amount of catalyst in the nanofibers or by controlling the amount of catalyst-bearing nanofibers added to a microfiber-nanofiber medium.

6. Large cost savings since the amount of catalysts in the medium is much less than when using catalyst coated fibers of catalyst particles.

Applications

The catalyst-ceramic nanofiber media or filters of the present invention are well suited to treat fluids such as noxious gases generated from combustion processes such as in catalytic converters connected to a vehicle engine, or conduits in electrical generating plants wherein the flu gas is derived from coal, petroleum, natural gas, and the like. The media or filters of the present invention cause oxidation and/or reduction reactions that reduce the amount of the noxious gases, convert a substantial portion or all to safe gases, or eliminate or eradicate the same. Noxious gases include unwanted, dangerous, or toxic components of combustion processes such as $NO_x$, CO, $SO_2$, $SO_3$, F$^-$, Cl$^-$, Br$^-$, $F_2$, $Cl_2$, $Br_2$, alcohols, ketones such as acetone, amines, hydrocarbons, and the like, wherein x is 1 to 2. The amount of the noxious gases reacted, converted, eliminated, etc., can very greatly and generally depend upon such factors as the concentration of the noxious gas, the flow rate thereof, the reaction temperature, a thickness of a filter media, the amount of catalyst on the fibers, and the like. The desired reduction amount of the noxious gases range from generally about 10% to about 99% and even 100%, desirably at least about 30% or about least about 50%, and preferably at least about 80%, or at least about 90% or at least about 95%, or at least about 97% by volume. The form of the catalyst(s)-nanofiber filters are numerous and include different types of arrangements, systems, matrix, filters, cartridges, and the like, such as those noted above.

The following examples serve to illustrate and explain the present invention but not to limit the same.

Catalyst-ceramic nanofibers made according to the present invention contain very small particles of an elemental catalyst therein, as well as thereon where the particles are exposed but partially embedded within the surface or otherwise attached to the surface of the nanofiber and the same is shown in FIG. 1. With respect to FIGS. 1A and 1C, the scale indicated by the solid bar is 100 nanometers whereas in FIGS. 1B and 1D, the scale indicated by the bar is 0.5 micron. FIG. 1A=alumina fibers, palladium particles, 1B=alumina fibers, platinum particles, 1C and 1D are alumina fibers and platinum oxide particles.

Figure 2:
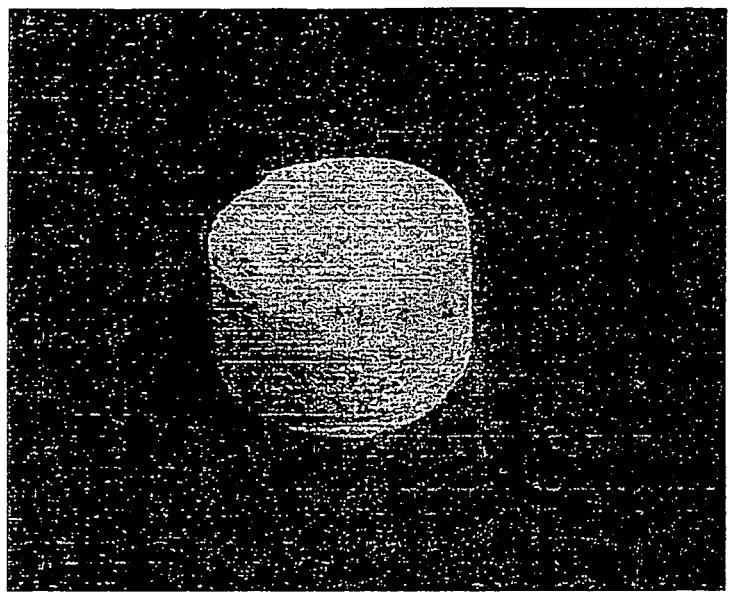
FIG. 2 is a perspective view of a catalytic filter puck made according to the present invention containing alumina support microfibers as well as palladium nanoparticles on alumina nanofibers.

Alternatively, the catalyst-ceramic nanofiber fillers of the present invention can be in the form of a puck as shown in FIG. 2. The puck was made utilizing nanofibers made utilizing 0.5 gram of alumina ceramic microfiber as a support fiber, 0.02 gram of starch, 0.053 gram of alumina ceramic nanofiber, 1 ml of alumina binder, and 25 drops of dilute acid in 4 liters of water. The nanofiber contained palladium nanoparticles partially embedded therein. The catalyst-ceramic nanofibers and the microfibers were mixed in the water to form a slurry with the binder and starch. The fiber slurry was agitated for at least 1 to about 24 hours to completely mix the fibers and the binder. The slurry was pulled by vacuum through filter paper (typically Whatman 113) supported on a wire mesh screen. The fibers formed a wet cake that was heated (120° C., 2 hours followed by 600° C., 2 hours) to dry the puck and to set the binder.

Figure 3:
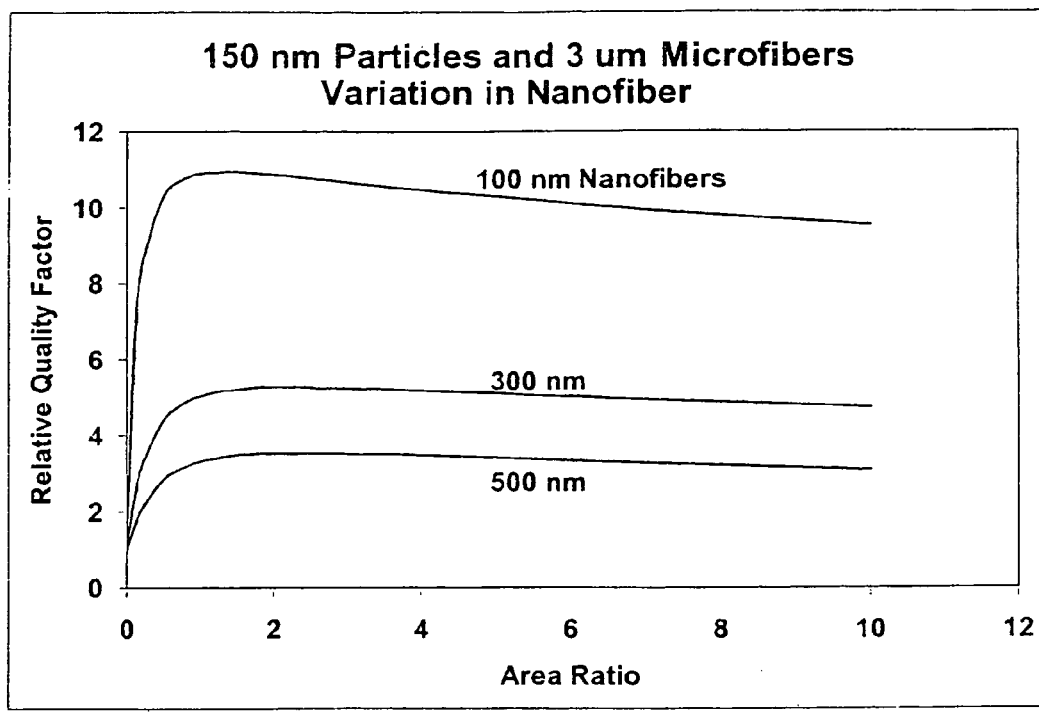
FIG. 3 is a graph illustrating the relationship of a quality factor for capture of particles from a gas stream with respect to an area ratio and nanofiber diameter.

FIG. 3 relates to a relative quality factor which sets forth the amount of particles collected on a filter made from support fibers having a diameter of 3 microns and catalyst particles having an average particle size of 150 nanometers. The variation of the amount of nanofibers is represented as the area ratio, i.e. the surface area of the nanofibers to the surface area of the microfibers. In most applications the filter with the larger quality factor has higher capture efficiency or lower pressure drop. That is, as apparent from FIG. 3, the smaller diameter nanofibers were more efficient in. collecting particles thereon. The plots shown in the figure were calculated in a computer model accounting for direct interception and Brownian motion particle capture mechanisms and slip flow motion of the gas past the fibers. The gas phase was air at atmospheric pressure and room temperature. The face velocity of the air was 2 m per second and the filter porosity varied from about 0.92 to 0.96 depending on the amount of nanofiber added to the filter medium. The particles were rigid solid spheres.

Figure 4:
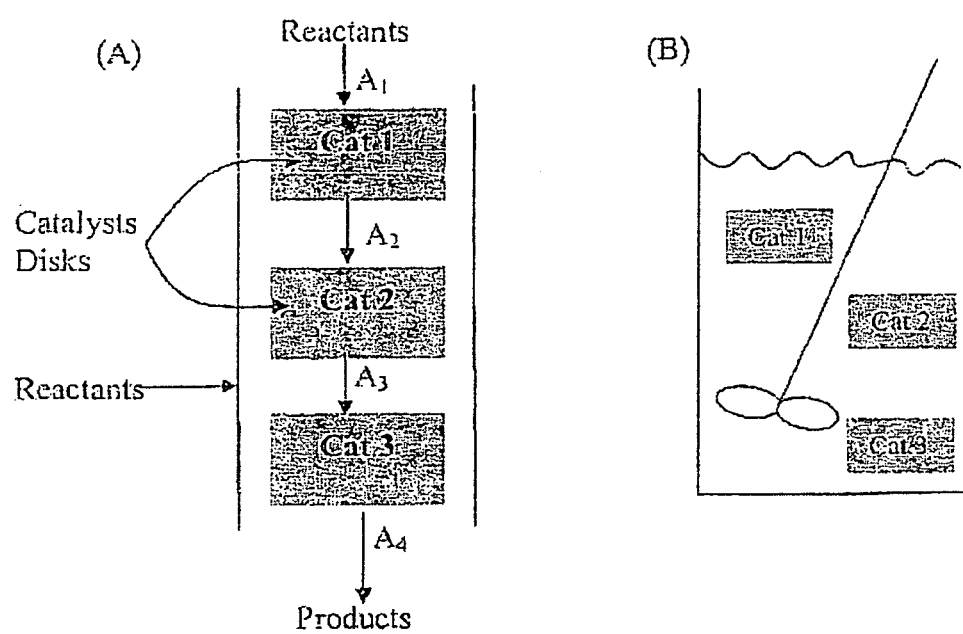
FIG. 4 is a diagram showing two different uses for the catalyst-nanofibers medium of the present invention such as in the form of disks.

Multiple catalyst-ceramic filters can be utilized to treat a fluid such as a gas or a liquid with each catalyst-ceramic filter causing a specific reaction such that multiple sequential reactions occur to achieve a desired end product. FIG. 4A is an example of a sequential reaction wherein three catalyst-ceramic nanofiber medium was used in a series of reactions in a continuous-flow system. That is

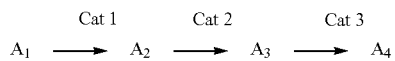

Another embodiment is shown in FIG. 4B wherein each filter medium having a different catalyst was added to a stirred reaction vessel and different simultaneous reactions occurred. An advantage of FIG. 4(A) over (B) is that selectivity may be improved to yield product $A_4$. In both cases the catalyst medium as in the form of a disk can be easily removed from the conduit or vessel and re-used. An industrial example of applying multiple catalysts in sequence is the process of hydrodesulfurization of petroleum. The petroleum is passed through a series of beds of catalysts as in FIG. 4A wherein the first catalyst-ceramic medium can be a cheaper catalyst which is poisoned by impurities such as vanadium and/or nickel oxide. The subsequent catalyst medium then hydrodesulfurize the petroleum.

EXAMPLE 1

The following examples relate to the effects of NO decomposition with respect to varying the inlet NO concentration.

A test was conducted without any samples (filter) at a flow rate of 1 cc/min for both the NO and CO gases to study the effect of temperature on the experiment. There was no change in the concentration of NO and CO. When the temperature was changed from room temperature up to 350° C., nitrogen, carbon dioxide and nitrous gases were formed showing a reaction may occur at elevated temperatures. The results of the test (blank test) are shown in FIG. 5.1. Here the concentration (ppm) is volume to volume ratio (v/v).

The catalytic filter media, which contained a constant amount of catalyst of 0.053 g palladium doped on the alumina nanofibers (92 wt % Pd respect to $Al_2O_3$) with 0.5 g of alumina microfibers, were tested for NO—CO reaction. The flow rate of nitric oxide was varied from 0.3 $cm^3$/min to about 1.5 $cm^3$/min while carbon monoxide flow was kept constant (i.e. 1.0 $cm^3$/min). Table 1 sets forth the detailed test conditions for the palladium catalyst containing filter media.

TABLE 1

| Test conditions for the palladium catalyst filter media. | |
|---|---|
| NO, $cm^3$/min | 0.3, 0.5, 1.0, and 1.5 |
| CO, $cm^3$/min | 1.0 |
| He, $cm^3$/min | 30.0 |
| $PdO/Al_2O_3$ catalyst, g | 0.053 |
| Surface area of catalyst*, $m^2$/g | 49.9 |
| Face velocity, cm/sec | 0.137, 0.138, 0.14, and 0.143 |
| SA of filter media*, $m^2$ $Pd/m^3$ media | 22,954 |
| Temperature, ° C. | 25, 100, 150, 200, 250, 300, 350, 400, and 450 |

*Calculated values, and calculations are described herein below.

The surface area of Pd catalyst particles was obtained as 50 $m^2$/g by calculations. The detail calculation and assumptions are shown as follows.

Assumptions: Catalyst particles are spherical in shape.
The average diameter of catalyst particle is 10 nm.
Density of Pd is 12,024 $kg/m^3$=12.024×106 $g/m^3$ $$\text{Volume of catalyst particles} = \frac{4}{3}\pi r^3 = \frac{\pi}{6}d_p^3$$

Area of catalyst particle=$4\pi r^2 = \pi d_p^2$ $$\frac{A_{C\text{-}particle}}{V_{C\text{-}Particle}} = \frac{\pi d_p^2}{\pi/6\, d_p^3} = \frac{6}{d_p}$$

-continued $$\frac{A_{C\text{-}particle}}{M_{C\text{-}Particle}} = \frac{\pi d_p^2}{\rho * V_{C\text{-}Particle}} = \frac{6}{\rho * d_p}$$

Total area of catalyst particles per gram of Pd $$\frac{A_{C\text{-}particle}}{M_{C\text{-}Particle}} = \frac{6}{\rho * d_p}$$

$$= \frac{6}{(12.024 \times 10^6 \text{ g/m}^3)(10 \times 10^{-9} \text{ m})}$$

$$= 49.9 \frac{m_{cat}^2}{g_{cat}}$$

The surface area of catalyst in the microfiber filter disk was also calculated with the following assumptions.
Assumptions: Diameter of filter puck=2.2 cm
Thickness of filter puck=1.4 cm
Mass of ceramic nanofibers added into filter puck=0.053 g
Mass of Pd within ceramic nanofibers=9.2%
Half of surface of each catalyst particle is exposed for reaction
Volume of filter puck: $V_{Filter\text{-}Puck} = h \cdot \pi r^2 = 0.014 \text{ m} \cdot \pi (0.011 \text{ m})^2 = 5.3 \times 10^{-6} \text{ m}^3$
Mass of Pd in filter puck:

$$M_{Pd\text{-}Filter\text{-}Puck} = M_{Nanofiber} \times P_{Pd} = 0.053 \text{ g} \times 0.092 = 0.004876 \text{ g}$$

Mass Density of Pd in filter puck in filter media $$\hat{M}_{Pd\text{-}Filter\text{-}Puck} = \frac{M_{Pd\text{-}Filter\text{-}Puck}}{V_{Filter\text{-}Puck}}$$

$$= \frac{0.004876 \text{ g}}{5.3 \times 10^{-6} \text{ m}^3}$$

$$= 920 \text{ g} - Pd/m^3 \cdot \text{media}$$

Total surface area of Pd in 1 m3 of filter media $$A_{C\text{-}Total\text{-}Media} = \hat{M}_{Pd\text{-}Filter\text{-}Puck} \times A_{C\text{-}Total\text{-}gram}$$

$$= 919 \times \frac{1}{2} \times 49.9$$

$$= 22,954 \text{ } m^2 - Pd/m^3 \text{ media}$$

FIG. 5.2 shows the concentration profile versus temperature plot with approximately 2,500 ppm of NO and 20,000 ppm of CO. The pressure drop was around 0.779 kPa for all reactions. It is in the similar range for the catalytic converter, which will be discussed later. The concentrations of NO and CO were almost the same as that at room temperature until reaction temperature reached to around 100~200° C. As temperature increased, the entire NO was converted to the nitrogen and nitrous oxide ($N_2O$) and at 300° C., the entire NO disappeared as well as the carbon monoxide was partially converted to the carbon dioxide.

FIGS. 5.3, 5.4 and 5.5 show similar results as FIG. 5.2. At lower nitric oxide concentration, the temperature for the entire nitric oxide reduction was observed lower, while the temperature required for complete nitric oxide decomposition was observed to be 350° C. for approximately 6,000 ppm of NO with remaining of carbon monoxide and it was observed to be 350° C. for the 18,000 ppm of NO, and carbon monoxide was completely converted to carbon dioxide (FIG. 5.3 and FIG. 5.4).

When the nitric oxide concentration was higher, there was higher consumption of carbon monoxide. When the flow rate of carbon monoxide was the same as that of the nitric oxide, it was observed that both disappear at the same temperature. FIG. 5.5 shows higher flow rates of nitric oxide than the carbon monoxide. In this reaction the carbon monoxide was entirely consumed for the reaction at 350° C. and the nitric oxide concentration reduced to a minimum unreacted concentration as expected from the reaction mechanism in the above equations.

EXAMPLE 2

Variation of the amount of the palladium catalysts.

The amounts of palladium catalyst doped alumina nanofiber were varied in the filters and the filters were tested at constant reactant flow rates of 1 $cm^3$/min for both NO and CO gases. The effect of variation in catalyst amount was tested by keeping the concentration of NO around 18,000 ppm while the concentration of CO was around 20,000 ppm. The total amount of nanofiber (palladium +alumina nanofiber) was varied from 0.001 to 0.10 gm per filter sample with constant amount of microfibers. The detail conditions are shown in Table 2. FIG. 5.6 to FIG. 5.8 show the results of NO—CO reaction at 0.001/g, 0.01/g, and 0.1/g of palladium oxide doped on the alumina nanofibers. The result for the palladium doped alumina nanofibers at 0.053 g was shown in FIG. 5.4. At higher catalyst concentration, nitric oxide was completely reacted at lower temperatures and the start temperature for the decomposition was also lower.

TABLE 2

| Test conditions for the palladium catalyst filter media. | |
|---|---|
| NO, $cm^3$/min | 1.0 |
| CO, $cm^3$/min | 1.0 |
| He, $cm^3$/min | 30.0 |
| PdO/$Al_2O_3$ catalyst, g | 0.001, 0.01, 0.053, and 0.1 g |
| Surface area of catalyst*, $m^2$/g | 49.9 |
| Face velocity, cm/sec | 49.9 |
| SA of filter media*, $m^2$ Pd/$m^3$ media | 0.14 |
| | 433, 4331, 22954, and 43309 |
| Temperature, ° C. | 25, 100, 150, 200, 250, 300, 350, 400, and 450 |

*Calculated values and calculations are described hereinbelow.

EXAMPLE 3

Reaction on Platinum Catalysts
Effect of NO Concentrations
The catalytic filter media that contained constant 0.053/g of platinum doped on the alumina nanofibers (9.5 wt % Pt respect to $Al_2O_3$) with 0.5/g of alumina microfibers were tested with nitric oxide flowed with changed flow rate from 0.3~1.5 $cm^3$/min at constant carbon monoxide flow rate (1.0 $cm^3$/min). The reaction conditions are shown in Table 3 and calculations were done the same way as for palladium with but with the density of platinum being 21.45 kg/$m^3$. FIG. 5.9 shows the concentration profile versus temperature. The concentrations of NO and CO were about the same as at room temperature until the reaction temperature reached about 150° C. At lower inlet nitric oxide concentration, the temperature for the entire nitric oxide reduction was lower. At the concentrations around 18,000 ppm of nitric oxide, the NO was completely reacted at 350° C., 300° C. for the experiments with inlet concentration of 7,500 ppm, and 250° C. for the 3,000 ppm inlet concentration. The reaction results are plotted in FIGS. 5.9 to 5.12. In experiments in which the flow rates of NO were greater than those of CO, the nitric oxide was not completely reacted and the results are plotted in FIG. 5.12.

TABLE 3

Test conditions for the platinum catalyst filter media.

| | |
|---|---|
| NO, cm$^3$/min | 0.3, 0.5, 1.0, and 1.5 |
| CO, cm$^3$/min | 1.0 |
| He, cm$^3$/min | 30.0 |
| PtO/Al$_2$O$_3$ catalyst, g | 0.053 |
| Surface area of catalyst*, m$^2$/g | 28 |
| Face velocity, cm/sec | 0.137, 0.138, 0.14, and 0.143 |
| SA of filter media*, m$^2$ Pt/m$^3$ media | 1,2880 |
| Temperature, ° C. | 25, 100, 150, 200, 250, 300, 350, 400, and 450 |

*Calculated values and calculations are described herein below.

EXAMPLE 4

In a manner similar to Examples 1, 2, and 3 set forth hereinabove, when the amount of platinum catalyst was varied, results similar to that obtained when the amounts of palladium were varied. That is, as greater amounts of the platinum catalyst were utilized, conversion of CO to CO$_2$ and conversion of NO to N$_2$ or N$_2$O was obtained at increasingly lower temperatures.

EXAMPLE 5

In a manner as set forth hereinabove, when rhodium catalyst-ceramic filter nanofibers were utilized, results with respect to amounts of NO concentrations and amounts of rhodium catalysts gave results similar to that when utilizing palladium and platinum catalysts.

Fixed-Bed or Fluidized-Bed Applications

Another broad area of application of the various catalyst-ceramic nanofiber mediums of the present invention is as a fixed or fluidized-bed catalyst with respect to chemical, petrochemical, plastic, pharmaceutical, and water treatment industries. Fixed bed catalysts as well as fluidized-bed catalysts applications generally relate to a fluid phase, preferably liquid, flowing through a particulate-solid phase that contains a solid phase as in the form of particles or fibers. Typically, the bed is located in a horizontal position with the fluid generally being passed upward therethrough although many other configurations can exist. Examples of such operations utilizing the catalyst-ceramic nanofiber medium of the present invention include filtration, heat transfer, mass transfer as in packed columns, chemical reactions, adsorption, and the like. In a fixed-bed catalyst situation, the catalyst-ceramic nanofiber medium of the present invention is stationary. In a fluidized-bed situation, the catalyst-ceramic nanofiber medium is contained in a fluid, the velocity of which is great enough that the momentum transferred from the fluid to the solid particles balances the opposing gravitational force on the catalyst-ceramic nanofibers and any support media so that the bed expands into a fluid-like phase. The support can be as set forth hereinabove such as various microfibers or other structures that support the catalyzed-ceramic nanofiber and is hereby fully incorporated by reference. As the bed expands, it retains its top horizontal surface with the fluid passing through the bed much as it did when the bed was stationary. However, the porosity is much greater and the individual ceramic nanofibers will move under the influence of the passing liquid. The structure of the bed, whether fixed or fluidized generally include a housing of any desired shape having a non-catalytic reactive support such as metal, refractory, ceramic, and the like.

Numerous structures with regard to fixed-bed and fluidized-beds exist as known to the art and to the literature and thus can be utilized in the present invention. In the present invention, the support can be as set forth hereinabove such as various microfibers or other structures that support the catalyzed-ceramic nanofiber. Typically, the bed orientation is horizontal with the fluid generally being passed upward therethrough although other configurations can exist. In the fluidized-bed situation, a fluid is passed upward through the support structure as well as the catalyst-ceramic nanofibers, or catalyst-ceramic nanosize particles of the present invention. The fixed or fluidized-beds, as noted, contain the catalyst-ceramic nanofiber medium therein as set forth hereinabove and thus the same is fully incorporated by reference with regard to the preparation of such catalyst-ceramic nanofibers, the various types of catalysts that can be used, the various types of ceramics that can be used, the porosity of the catalyst-ceramic nanofiber medium, and the like.

With respect to the chemical industry, the catalyst-ceramic nanofiber medium can be utilized to catalyze numerous different types of chemical reactions to form existing chemical compounds as well as new chemical compounds and the like. Another chemical utilization is in the area of paints and coatings wherein the catalyst-ceramic nanofibers can be utilized to neutralize or react various solvents to form environmental-friendly compounds, for example the formation of water and/or carbon dioxide, acetate, chloride, or bromide, and so forth. Still other chemical uses include styrene to ethylbenzene conversion using Pd, Pt, Rh catalyst, polyol conversion, methylvinylketone from methanol on Cu, Ag, Zn catalysts, and carbonylation of chloroacetates on supported Rh catalysts. Other reactions include oxidation of linear and branched alkanes by vanadyl phosphate catalysts, alkene hydroformylation, alkylation of aromatics, isomerization, transalkylation of alkylaromatics, dehydrogenation reactions, hydrogenation reactions, hydroformylation, selective oxidations, amination reactions, halogenation reactions, acylation of aromatics, nucleophilic aromatic substitution reactions, elimination and addition reactions, oligomerization and metathesis, enantioselective catalysts and reactions, biocatalytic reactions with immobilized enzymes, and the like.

With respect to the petrochemical industry, the catalyst-ceramic nanofiber media of the present invention can be utilized to carry out three general processes, i.e. fluid catalytic cracking, isomerisation, and reforming. Many other processes also exist as known to the art and to the literature. Fluid catalytic cracking involves the breaking up of large molecules, generally hydrocarbons, into smaller and useful molecules. Isomerisation generally involves taking a petrochemical fraction such as hydrocarbons used in making gasoline and converting straight chain molecules into branched chain molecules. Reforming uses a catalyst along with various promoters to make the catalyst more efficient. Specific end uses of a catalyst-ceramic nanofiber medium of the present invention involve making petroleum gases for heating, cooking, and making plastics; the production of naphtha or ligroin; intermediates that can be further processed to make gasoline; the production of gasoline for various vehicle engines; the production of kerosene for jet engines, tractors, etc.; the production of diesel fuel and heating oil; the production of lubricating oil; precursors for polymers (i.e. monomers) using fluidized bed reactors, such as rubber, vinyl chloride, polyethylene, and styrene; and the like.

Uses in the plastic industries include catalyzing various polymerization reactions to form polymers, to promote crosslinking thereof, and to control the molecular weight thereof.

With respect to the water purification industry, the catalyst-ceramic nanofibers can be utilized in various forms to purify water as by destroying bacteria therein such as by through the use of titanium or zinc catalyst.

The catalyst-ceramic nanofibers can be utilized in the pharmaceutical industry to catalyze numerous reactions; e.g. the Suzuki reaction, Suzuki-Miyaura reaction; and form medical compounds, biological compounds, medical drugs, and intermediate compounds, such as for example n-alkyl substituted anilines, carbonylation of (4-bromomethyl)anisole and sartan-based drugs.

In accordance with the patent statutes, the best mode and preferred embodiment have been set forth; the scope of the invention is not limited thereto, but rather by the scope of the attached claims.

What is claimed is:

1. A catalyst-containing nanofiber composition, comprising:
    a ceramic nanofiber having a plurality of metal catalysts wherein the metal catalysts exist as dispersed particles partially embedded in the nanofiber and cover from about 1% to about 90% of the surface area of the ceramic nanofiber.

2. The composition according to claim 1, including a plurality of the ceramic nanofiber, wherein the ceramic nanofiber has an average fiber diameter of from about 1 to about 500 nanometers, and wherein the metal catalysts have an average diameter of 0.1 to about 500 nanometers.

3. The composition according to claim 2, wherein the ceramic nanofiber is derived from an earthy raw material, a metal salt, a metal halide, or an organic metal compound, or a combination thereof, and wherein the metal catalysts are derived from a noble metal, a precious metal, a metal salt, a metal oxide, a metal organic ester, or a metal halide, or a combination thereof.

4. The composition according to claim 3, wherein the ceramic nanofiber is derived from a compound comprising aluminum, titanium, zinc, or silicon, or a combination thereof, and wherein the metal catalysts are derived from a compound comprising platinum, palladium, rhodium, iron, cobalt, nickel, copper, silver, gold, or zeolites, or any combination thereof.

5. The composition according to claim 3, wherein the ceramic nanofiber average diameter is about 5 to about 250 nanometers, and wherein the catalyst average diameter is about 0.5 to about 200 nanometers.

6. The composition according to claim 1, wherein the composition further includes a plurality of support fibers, said composition being porous.

7. The composition according to claim 6, wherein the support fibers have an average diameter of about 1 micron to about 5 millimeters, and said support fibers comprise a ceramic fiber, glass fiber, metal fiber, a polymer fiber, or a combination thereof.

8. A catalytic device, comprising:
    a support structure and a catalyst-containing ceramic nanofiber composition containing a plurality of metal catalysts, the nanofiber composition operatively connected to the support structure, and wherein the metal catalysts exist as dispersed particles partially embedded in the nanofiber and cover from about 1% to about 90% of the surface area of the ceramic nanofiber.

9. The catalytic device according to claim 8, wherein the support structure and catalyst-containing nanofiber composition are in the form of a plurality of ceramic support fibers, a porous membrane, a porous bed, a porous sheet, a porous disc, a porous conduit, or a non-porous structure.

10. The catalytic device according to claim 9, wherein the support structure is: a conduit and the catalyst-containing nanofiber composition is operatively connected to an inner surface of the conduit or wherein the support surface is a flat surface wherein the catalyst-containing nanofiber composition is located on at least one face of the flat surface.

11. The catalytic device according to claim 9, for use in chemical, petrochemical, plastic, pharmaceutical, and water treatment industries, wherein the ceramic nanofiber has an average fiber diameter of from about 1 to about 500 nanometers, wherein the metal catalysts have an average diameter of 0.1 to about 500 nanometers, and wherein the ceramic nanofiber is derived from an earthy raw material, a metal salt, a metal halide, or an organic metal compound, or a combination thereof, and wherein the metal catalysts are derived from a noble metal, a precious metal, a metal salt, a metal oxide, a metal organic ester, or a metal halide, or a combination thereof.

12. The catalytic device according to claim 11, wherein the catalytic device comprises a fixed catalyst bed or a fluidized catalyst bed, wherein the ceramic nanofiber is derived from a compound comprising indium, lead, germanium, gallium, erbium, cadmium, aluminum, calcium, zirconium, manganese, titanium, tungsten, zinc, cerium, calcium, tin, a lanthanide, an actinide, or silicon, or a combination thereof, wherein the metal catalysts are derived from a compound comprising gold, silver, platinum, palladium, iridium, ruthenium, rhodium, osmium, vanadium, chromium, molybdenum, manganese, iron, cobalt, nickel, copper, or a zeolite, or a combination thereof, and wherein the support fibers comprise a ceramic fiber, glass fiber, metal fiber, a polymer fiber, or a combination thereof.

13. The catalytic device according to claim 9, for the catalytic conversion of noxious gases, wherein the ceramic nanofiber has an average fiber diameter of from about 1 to about 500 nanometers, and wherein the metal catalysts have an average diameter of 0.1 to about 500 nanometers, wherein the ceramic nanofiber is derived from an earthy raw material, a metal salt, a metal halide, or an organic metal compound, or a combination thereof, and wherein the metal catalysts are derived from a noble metal, a precious metal, a metal salt, a metal oxide, a metal organic ester, or a metal halide, or a combination thereof.

14. The catalytic device according to claim 13, wherein said noxious gases comprise $NO_x$ where x is 1 to 2, $CO$, $SO_2$, $SO_3$, F, Cl, Br, $F_2$, $Cl_2$, $Br_2$, alcohol, ketone, amine, hydrocarbon, or any combination thereof, wherein the ceramic nanofiber is derived from a compound comprising indium, lead, germanium, gallium, erbium, cadmium, aluminum, calcium, zirconium, manganese, titanium, tungsten, zinc, cerium, calcium, tin, a lanthanide, an actinide, or silicon, or a combination thereof, and wherein the metal catalysts are derived from a compound comprising gold, silver, platinum, palladium, iridium, ruthenium, rhodium, osmium, vanadium, chromium, molybdenum, manganese, iron, cobalt, nickel, copper, or a zeolite, or a combination thereof.

15. A process for utilizing a catalyst-containing nanofiber, comprising the steps of:
provide a ceramic nanofiber containing a plurality of metal catalysts on a support, wherein the metal catalysts exist as dispersed particles partially embedded in the nanofiber and cover from about 1% to about 90% of a surface area of the ceramic nanofiber; and
contacting the catalyst-containing nanofiber with a gas or liquid or a combination thereof wherein the catalyst catalyzes a reaction of a component of the gas or liquid or a combination thereof.

16. The process according to claim 15, wherein the reaction catalyzed is a gas comprising $NO_x$ where x is 1 to 2, CO, $SO_2$, $SO_3$, F, Cl, Br, $F_2$, $Cl_2$, $Br_2$, alcohol, ketone, amine, hydrocarbon, or a noxious gas, or any combination thereof.

17. The process according to claim 15, wherein the catalyst-containing nanofiber is provided on a surface of a porous support material.

18. The process according to claim 15, wherein the ceramic nanofiber has an average fiber diameter of from about 1 to about 500 nanometers, and wherein the metal catalysts have an average diameter of 0.1 to about 500 nanometers, wherein the ceramic nanofiber is derived from an earthy raw material, a metal salt, a metal halide, or an organic metal compound, or a combination thereof, and wherein the metal catalysts are derived from a noble metal, a precious metal, a metal salt, a metal oxide, a metal organic ester, or a metal halide, or any combination thereof.

* * * * *